(12) United States Patent
Hay et al.

(10) Patent No.: US 11,327,786 B2
(45) Date of Patent: May 10, 2022

(54) DISTRIBUTING INTERRUPT REQUEST TO BE HANDLED BY TARGET VIRTUAL PROCESSOR

(71) Applicant: Arm Limited, Cambridge (GB)

(72) Inventors: Timothy Nicholas Hay, Cambridge (GB); Haralds Capkevics, Cambridge (GB)

(73) Assignee: Arm Limited, Cambridge (GB)

( * ) Notice: Subject to any disclaimer, the term of this patent is extended or adjusted under 35 U.S.C. 154(b) by 113 days.

(21) Appl. No.: 16/934,353

(22) Filed: Jul. 21, 2020

(65) Prior Publication Data

US 2022/0027190 A1    Jan. 27, 2022

(51) Int. Cl.
| | | |
|---|---|---|
| *G06F 9/48* | (2006.01) | |
| *G06F 9/455* | (2018.01) | |
| *G06F 9/50* | (2006.01) | |
| *G06F 13/24* | (2006.01) | |

(52) U.S. Cl.
CPC ........ *G06F 9/4812* (2013.01); *G06F 9/45558* (2013.01); *G06F 9/5066* (2013.01); *G06F 9/5077* (2013.01); *G06F 13/24* (2013.01); *G06F 2009/45579* (2013.01)

(58) Field of Classification Search
CPC .... G06F 9/45558; G06F 13/24; G06F 9/4812; G06F 9/5066; G06F 9/5077
See application file for complete search history.

(56) References Cited

U.S. PATENT DOCUMENTS

| | | | |
|---|---|---|---|
| 2016/0140064 A1* | 5/2016 | Chin ...................... | G06F 13/26 710/119 |
| 2019/0042330 A1* | 2/2019 | Duarte Cardoso ... | G06F 9/5094 |
| 2019/0146803 A1* | 5/2019 | Reed ...................... | H04L 67/10 703/2 |
| 2020/0264912 A1* | 8/2020 | Raisch .................... | G06F 13/24 |
| 2021/0132979 A1* | 5/2021 | Moffet ................ | G06F 9/45558 |

OTHER PUBLICATIONS

Lip-Min Kohr, "Enterprise Visualization with ARM CoreLink SMMU and ARM CoreLink GIC", ARM, Apr. 2017, 11 pages.

\* cited by examiner

*Primary Examiner* — Zachary K Huson
(74) *Attorney, Agent, or Firm* — Nixon & Vanderhye P.C.

(57) ABSTRACT

Virtual processors are mappable to a number of physical processors. An interrupt distributor is responsible for distributing interrupt requests to a subset of the physical processors. An interface communicates with further interrupt distributors responsible for other physical processors. In response to an interrupt request to be handled by a target virtual processor, the interrupt distributor determines, based on cached virtual processor mapping information, whether to route the interrupt request to one of the subset of physical processors or to one of the further interrupt distributors. When a rejection response is received in response to an interrupt request routed to one of the further interrupt distributors, an update of the cached virtual processing mapping information is requested based on shared virtual processor mapping information, and a resent interrupt request is sent to a further interrupt distributor determined based on the shared virtual processor mapping information.

19 Claims, 10 Drawing Sheets

DISTRIBUTING INTERRUPT REQUEST TO BE HANDLED BY TARGET VIRTUAL PROCESSOR

BACKGROUND

Technical Field

The present technique relates to the field of data processing. More particularly, it relates to distributing an interrupt request.

Technical Background

Virtualisation allows multiple operating systems to run concurrently on the same piece of system hardware. Each operating system may run on a virtual processor (or virtual machine, VM) that operates under the impression of having exclusive access to the processors, peripherals, system memory and input/output devices of the system hardware, but which is actually sharing that hardware with other virtual processors. The physical hardware may include a number of physical processors which can be mapped to particular virtual processors. A given virtual processor may from time to time be moved from one physical processor to another. A given physical processor may at a given time have more than one virtual processor mapped to it, but may be executing instructions from a particular one of those virtual processors mapped to that physical processor. A virtual processor which is currently having instructions executed from it may be considered to be a resident virtual processor, while other virtual processors which are mapped to a given physical processor but which are not currently having their instructions executed may be considered non-resident virtual processors. Virtualisation can be particularly useful for the enterprise server application space, where one physical server comprising a number of physical processors can be configured to support many virtual machines, even as many as tens, hundreds or thousands of virtual machines. Such virtualised servers may provide services such as web hosting, cloud services, database and storage management for example.

SUMMARY

At least some examples provide an apparatus comprising: an interrupt distributor to receive an interrupt request to be handled by a target virtual processor selected from among a plurality of virtual processors mappable to a plurality of physical processors, where the interrupt distributor is responsible for distributing interrupt requests to a subset of said physical processors; and an interface to communicate with further interrupt distributors responsible for distributing interrupt requests to physical processors other than said subset of said physical processors; in which: in response to the interrupt request, the interrupt distributor is configured to: determine, based on cached virtual processor mapping information, whether to route the interrupt request to one of said subset of physical processors or to one of the further interrupt distributors; and when a rejection response is received in response to an interrupt request routed to one of the further interrupt distributors: request an update of the cached virtual processor mapping information based on shared virtual processor mapping information obtained from a storage location accessible to the interrupt distributor and the further interrupt distributors; and route a resent interrupt request to a further interrupt distributor determined based on the shared virtual processor mapping information.

At least some examples provide an apparatus comprising: means for distributing interrupt requests, to receive an interrupt request to be handled by a target virtual processor selected from among a plurality of virtual processors mappable to a plurality of physical processors, where the means for distributing is responsible for distributing interrupt requests to a subset of said physical processors; and means for communicating with further means for distributing interrupt requests to physical processors other than said subset of said physical processors; in which: in response to the interrupt request, the means for distributing is configured to: determine, based on cached virtual processor mapping information, whether to route the interrupt request to one of said subset of physical processors or to one of the further means for distributing; and when a rejection response is received in response to an interrupt request routed to one of the further means for distributing: request an update of the cached virtual processor mapping information based on shared virtual processor mapping information obtained from a storage location accessible to the means for distributing and the further means for distributing; and route a resent interrupt request to a further means for distributing determined based on the shared virtual processor mapping information.

At least some examples provide a method comprising: receiving, at an interrupt distributor, an interrupt request to be handled by a target virtual processor selected from among a plurality of virtual processors mappable to a plurality of physical processors, where the interrupt distributor is responsible for distributing interrupt requests to a subset of said physical processors, and further interrupt distributors are responsible for distributing interrupt requests to physical processors other than said subset of said physical processors; and in response to the interrupt request, the interrupt distributor: determining, based on cached virtual processor mapping information, whether to route the interrupt request to one of said subset of physical processors or to one of the further interrupt distributors; and when a rejection response is received in response to an interrupt request routed to one of the further interrupt distributors: requesting an update of the cached virtual processor mapping information based on shared virtual processor mapping information obtained from a storage location accessible to the interrupt distributor and the further interrupt distributors; and routing a resent interrupt request to a further interrupt distributor determined based on the shared virtual processor mapping information.

Further aspects, features and advantages of the present technique will be apparent from the following description of examples, which is to be read in conjunction with the accompanying drawings.

DESCRIPTION OF EXAMPLES

Figure 1:
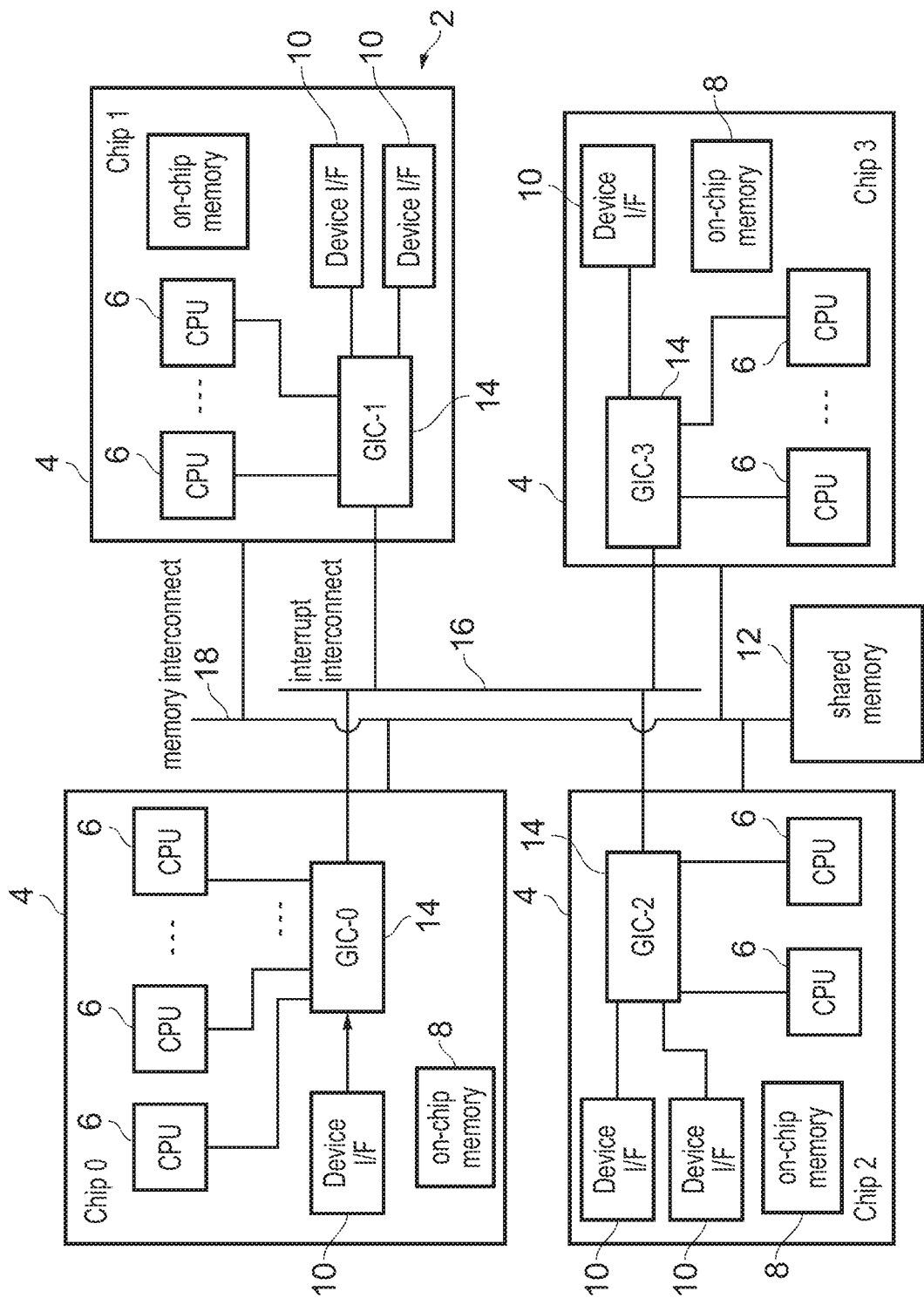
FIG. 1 schematically illustrates an example of a data processing system having a number of interrupt controllers, which in this example are located on different integrated circuits.

A virtualised processing system may have a certain number of physical processors, and may support the execution of a certain number of virtual processors, where those virtual processors can be mapped to different physical processors. For example the mapping of virtual processors to physical processors may be selected by software depending on factors such as the workloads required for different virtual processors and the physical resources available at each physical processor. Transfers of a virtual processor from one physical processor to another may be relatively common operations in enterprise server environments. This may cause some complexity for interrupt handling, because some interrupt requests may need to be handled by a particular target virtual processor selected from the overall set of virtual processors, and so interrupt distributors for distributing the interrupt request to the appropriate physical processor to handle the interrupt request may need to track the particular physical processor at which a given virtual processor is mapped, so that they can route the interrupt request to the correct physical location. However, modern data processing systems may have a relatively large number of physical processors (which may be located on different integrated circuits in some examples, or may be a physically long distance apart on a single integrated circuit). Also, to reduce the burden on a central point of interrupt distribution, it may be that the interrupt controller is divided into a number of separate interrupt distributors, each responsible for distributing interrupt requests to a certain subset of the physical processors. These factors can make it relatively complex or burdensome to maintain precise tracking information at each interrupt distributor which precisely indicates the physical processor at which each virtual processor is located. As transfers of a virtual processor from one physical processor to another may be relatively common then the overhead in exchanging messages for precisely keeping this tracking information up to date may not be justified.

One approach to keeping account of the locations at which each virtual processor is mapped may be that when a transfer on the virtual processor is instructed, the interrupt distributor responsible for distributing interrupt requests to the physical processor at which the virtual processor was previously mapped may be responsible for broadcasting the transfer of the virtual processor to all other interrupt distributors in the system, to notify them of the move so that they can update their tracking information. However, as the other interrupt distributors may be a physically long way away from the initiating interrupt distributor and could even be on different integrated circuits, there may be a significant delay in the messaging for broadcasting the move of the virtual processor. While the messaging for updating a piece of tracking information based on the transfer of the virtual processor is being carried out, there may be interrupts being received which target that virtual processor and would need to be dealt with, but it may be unsafe to do so during the updating process for updating the tracking information to reflect the transfer of the virtual processor, and so this broadcast approach may result in interrupts effectively remaining un-serviced for a significant period of time, which may be harmful to performance. Also, the broadcast approach incurs an overhead at those interrupt distributors which are not involved in the transfer of the virtual processor (which are not responsible for either the source physical processor or the destination physical processor between which the virtual processor is being transferred). At those other interrupt distributors, the update overhead may be unnecessary as it could be that the virtual processor may get moved again before that interrupt distributor receives any interrupts targeting that virtual processor, in which case the overhead of responding to the broadcast messaging may have been redundant. If there are frequent transfers of virtual processors but relatively rare interrupt requests for a given virtual processor then the overhead of broadcasting each transfer may incur an unnecessary power cost and performance cost.

In the technique discussed below, counter-intuitively it is recognised that it is not essential for each interrupt distributor to maintain a precise indication of virtual processor mappings tracking which physical processor each virtual processor is mapped to, and it is acceptable for the information held at a given interrupt distributor to be incorrect. A storage location may be provided accessible to each interrupt distributor which may store shared virtual processor mapping information which is updated to indicate the actual location of a given virtual processor. Each interrupt distributor may maintain cached virtual processor mapping information which is based on this shared virtual processor mapping information, but could be out of date and so may indicate the incorrect mapping for a given virtual processor. As this opens up the possibility that, when an interrupt request is received to be handled by a target virtual processor, the incorrect cached virtual processor mapping information could lead to the interrupt request being routed to the wrong destination, a rejection mechanism is provided where a given interrupt distributor receiving an interrupt request forwarded from another interrupt distributor may reject it if that interrupt request is not actually targeting one of the physical processors for which that interrupt distributor is responsible. While it may seem undesirable that interrupt requests may be rejected and then may need to be resent if they were previously sent to the wrong destination, in practice this overhead is much less than the overhead that would be associated with broadcasting each transfer of virtual processor to other interrupt distributors, and results in less performance cost compared to blocking the handling of interrupt requests while the updates following a transfer are broadcasted as in the alternative approach discussed above. Hence, overall the approach of resending incorrectly routed interrupts can provide improved performance.

Hence, an apparatus may have an interrupt distributor to receive an interrupt request to be handled by a target virtual processor selected from among a number of virtual processors mappable to a certain number of physical processors. The interrupt distributor is responsible for distributing interrupt requests to a particular subset of those physical processors. That subset may be a proper subset of the physical processors so there is at least one physical processor which the interrupt distributor is not responsible for. An interface is provided to communicate with further interrupt distributors which are responsible for distributing interrupt requests to other physical processors, other than the subset of physical processors for which the interrupt distributor is responsible. These further interrupt distributors could be on the same integrated circuit as the interrupt distributor, or could be on a different integrated circuit to the interrupt distributor.

In response to receiving an interrupt request targeting a given target virtual processor, the interrupt distributor may determine, based on the cached virtual processor mapping information (which could potentially be incorrect) whether to route the interrupt request to one of the subset of physical processors for which it is responsible, or to one of the further interrupt distributors. One of the further interrupt distributors may be selected if the cached virtual processor mapping information indicates that the target virtual processor is not mapped to a physical processor in the subset for which that interrupt distributor is responsible. If the cached virtual processor mapping information turns out to be correct, then routing the interrupt request to a selected further interrupt distributor or to one of the subset of physical processors may then allow the interrupt to be handled by the correct physical processor to which the target virtual processor is mapped.

However, if the cached virtual processor mapping was incorrect then it may be that the location to which the interrupt request was routed may reject the interrupt response.

If, in the case when the interrupt request was routed to one of the further interrupt distributors, a rejection response is received, then the interrupt distributor may request an update of the cached virtual processor mapping information based on shared virtual processor mapping information obtained from a storage location which is accessible to both the interrupt distributor itself and to the further interrupt distributors with which the interrupt distributor can communicate over the interface. The interrupt distributor may then route a resent interrupt request to a further interrupt distributor determined based on the shared virtual processor mapping information. Hence, once the actual location of the target virtual processor has been determined based on the shared virtual processor mapping information then resending the interrupt request can allow the interrupt request to reach its correct location so that the interrupt may be serviced.

Hence, counter-intuitively, while permitting cached virtual processor mapping information to potentially be incorrect may seem a disadvantage, in practice this can be more efficient than maintaining more precise indications of virtual processor mappings at each interrupt distributor, and by providing the resend mechanism described above this allows interrupts to be correctly handled even if an initial attempt to distribute an interrupt turned out to be incorrect due to the use of incorrect cached virtual processor mapping information. This provides greater performance and lower power consumption overall.

When the interrupt distributor determines, based on the cached virtual processor mapping information, to route the interrupt request to one of the subset of physical processors for which it is responsible, then it is not essential for the interrupt request to be routed immediately in response to receiving the interrupt request. It may be that the target virtual processor is mapped to one of the subset of physical processors, but is not currently resident, in that its instructions are not currently being executed by the corresponding physical processor, and the target virtual processor may be awaiting a time slot when it will later become resident. Hence, in some cases the interrupt distributor could maintain a table of pending interrupts for respective virtual processors which could indicate that when the virtual processor next becomes resident then the interrupt request should be routed to that virtual processor's corresponding physical processor. Hence, the exact timing at which the interrupt request is to be routed to its destination may vary from implementation to implementation.

The apparatus may have mapping update circuitry which is responsible for updating the shared virtual processor mapping information when a given virtual processor is transferred from a source physical processor to a destination physical processor. In response to a virtual processor transfer command indicating that the given virtual processor is to be transferred, the mapping update circuitry may trigger an update of the shared virtual processor mapping information to indicate that the given virtual processor is now mapped to the destination physical processor. Hence, the shared virtual processor mapping information can be kept up to date when a virtual processor is transferred between physical processors.

In some examples, the mapping update circuitry could be implemented as a single non-distributed piece of circuit logic which responds to virtual processor transfer commands, and is shared between the interrupt distributor and the further interrupt distributors rather than being associated with a particular one of the interrupt distributors.

However, in another approach, the mapping update circuitry may be associated with a particular interrupt distributor, and each of the interrupt distributor and the further interrupt distributors may have its own instance of the mapping update circuitry. In this case, when the mapping update circuitry is associated with the interrupt distributor, it may be arranged to update the shared virtual processor mapping information in response to a virtual processor transfer command when the destination physical processor is one of the subset of physical processors for which that interrupt distributor is responsible. Hence, the mapping update circuitry in any interrupt distributors which are not associated with the destination physical processor need not trigger the update of the shared virtual processor mapping information.

The mapping update circuitry at a given interrupt distributor may also update that interrupt distributor's cached virtual processor mapping information, when either the source physical processor or the destination physical processor is one of a subset of physical processors for which the interrupt distributor is responsible. Hence, on a transfer of a target virtual processor, the mapping update circuitry associated with the interrupt distributors responsible for the source and destination physical processors may both update their cached virtual processor mapping information (or, if both source and destination physical processors are associated with the same interrupt distributor, only one interrupt distributor may update its cached virtual processor mapping information). However, this may be done without broadcasting the update of the shared virtual processor mapping information to any further interrupt distributors which are not responsible for distributing interrupt requests to either the source physical processor or the destination physical processor. Hence, any interrupt distributors which are not associated with the source or destination physical processors may continue to cache out of date virtual processor mapping information which could differ from the updated shared virtual processor mapping information, as their cached information would not be updated in response to the virtual processor transfer command itself. By restricting updates at the time of transferring the virtual processor to the interrupt distributors associated with the source and destination physical processor, this reducing the messaging overhead (by eliminating communications with interrupt distributors associated with processors not involved in the transfer). By avoiding a broadcast window, this means it is not necessary to block interrupts for a time while the broadcast is pending, which would otherwise be harmful for performance.

The interrupt distributor and the further interrupt distributors may have corresponding configurations, so that each of the interrupt distributor and the further interrupt distributors may have the same circuit design. Alternatively, there may be minor differences between interrupt distributors, although the general functionality may be similar. Hence, each of the interrupt distributors could sometimes act as a source interrupt distributor which receives the original interrupt request and may then decide how to route it to other interrupt distributors, or could other times act as a target interrupt distributor which is responsible for distributing interrupts to the physical processor running the target virtual processor which is to handle the interrupt, with this interrupt request having been forwarded to it by another interrupt distributor. Hence, the same interrupt distributor may sometimes receive the original interrupt request and may other times receive a forwarded interrupt request (either the initial attempt or a resent interrupt request) from another interrupt distributor.

The resend mechanism described above describes a functionality of the interrupt distributor when it directly receives the original interrupt request as the source interrupt distributor and then decides how to route it on, either to one of its subset of physical processors or to a further interrupt distributor.

On the other hand, at other times the interrupt distributor may act as the target interrupt distributor and so may receive a received interrupt request from a given further interrupt distributor which was the source interrupt distributor for that particular interrupt request. In this case, in response to the received interrupt request received from the given further interrupt distributor, the interrupt distributor acting as the target interrupt distributor may check its cached virtual processor mapping information and determine whether the target virtual processor specified by the received interrupt request is mapped to one of its subset of physical processors for which it is responsible.

When the target virtual processor for the interrupt request received from the given further interrupt distributor is mapped to one of the subset of physical processors, the interrupt distributor may pass the received interrupt request to the physical processor which the cached virtual processor mapping information indicates the target virtual processor is mapped to, and may return an acknowledgement response to the given further interrupt distributor. The acknowledgement response may indicate that the given further interrupt distributor did correctly transfer the interrupt request to the correct other interrupt distributor.

Note that if the mapping update approach discussed above (where the interrupt distributors responsible for the source and destination physical processors are responsible for updating their cached virtual processor mapping information when a transfer involving the source and destination physical processors is carried out) then it is unlikely that the cached virtual processor mapping information at a particular interrupt distributor may incorrectly indicate that the target virtual processor is mapped to one of the subset of physical processors. Errors in the cached virtual processor mapping information may be more likely to arise where the cached virtual processor mapping information indicates that the target virtual processor is mapped to another physical processor other than the subset of physical processors for which that particular interrupt distributor is responsible, as this may indicate that a transfer of the target virtual processor was carried out which did not involve a physical processor for which that interrupt distributor is responsible. Hence, it may be unlikely (in the case when the interrupt distributor passes the receive interrupt request to one of its subset of physical processors) that this would be incorrect, but nevertheless some implementations may also provide a further retry mechanism to deal with the eventuality that the indication of the physical processor may itself have been incorrect.

On the other hand, if, in response to the received interrupt request received from a given further interrupt distributor, the cached virtual processor mapping information indicates that the target virtual processor specified by the received interrupt request is not mapped to one of the subset of physical processors for which the interrupt distributor is responsible, then the interrupt distributor may provide a rejection response to the given further interrupt distributor which routed the interrupt request to the interrupt distributor. This rejection response may trigger the given further interrupt distributor to update its cached virtual processor mapping information and resend the interrupt request using the resend mechanism discussed above. Hence, the interrupt distributor provides either the acknowledgement response or the rejection response to signal to the given further interrupt distributor whether its decision to pass the interrupt request to the interrupt distributor was correct or not.

When the interrupt distributor routes a given interrupt request to a further interrupt distributor and then receives the rejection response in reply, the interrupt distributor resends the interrupt request to a further interrupt distributor determined based on the updated cached virtual processor mapping following checking of the shared virtual processing information. If at least one earlier attempt to send the interrupt request (or a recent interrupt request) to the same further interrupt distributor has already been made, the resent request may be sent with a different encoding to an encoding used for a first attempt to send the interrupt request to that further interrupt distributor. This allows the further interrupt distributor to distinguish whether an interrupt request is being repeatedly routed to the same destination incorrectly, which could be an indication that an error has occurred. The encoding of the resent interrupt request could vary in different ways compared to the encoding of the earlier attempt. For example, a different interrupt request type could be specified. Alternatively the resent interrupt request could be sent with the same interrupt request type for each attempt, but may include a bit indicating whether it is the first attempt or a subsequent attempt (e.g. a "hazard" flag which signals whether there is a possibility that an error has occurred). In another example, interrupt requests may be sent specifying a retry count indicating how many times the interrupt request has already been attempted to be sent to the same destination, so that the resent interrupt request may specify different value for the retry count compared to the original interrupt request. Regardless of the particular encoding technique used, it can be useful to distinguish resent interrupt requests from original interrupt requests, to allow the system to detect deadlock scenarios where if there have been a number of attempts to resend the interrupt request to the same destination then eventually handling of the interrupt is aborted as this may signal that some error has arisen.

For example, the interrupt distributor or the further interrupt distributor could include a mechanism to abort handling of an interrupt request after a certain number of attempts to resend it to the same destination without success. This could help detect errors due to corruption of the shared virtual processing mapping information, or due to a temporary or permanent hardware fault in a storage circuit or control logic circuit within the interrupt distributor. For example, randomly occurring hardware errors, such as a bit flipping in a storage element due to being struck by a subatomic particle or being subject to radiation, or a randomly occurring hardware fault which causes the physical electronic components to deteriorate so that certain bits could be stuck at zero or stuck at one, may arise randomly and such an error could result in the shared virtual processor mapping information eventually indicating the incorrect value, which could lead to a given interrupt distributor determining that the target virtual processor is located at one physical processor even if no transfer involving that target virtual processor has occurred and the target virtual processor is actually resident on another physical processor. If there is no subsequent transfer of the target virtual processor, then the error may not be detected and in the meantime several interrupt requests may be routed to the wrong destination. By providing the mechanism to abort handling of an interrupt request after a certain number of attempts, this can prevent the system entering a deadlock scenario where there are continued attempts to resend the interrupt request without success.

In one example, monitoring circuitry may be provided to perform monitoring for transfer of a specified virtual processor, to maintain tracking information indicating whether the specified virtual processor has been subject to a transfer of mapping to or from one of the subset of physical processors associated with the interrupt distributor. In some examples each of the interrupt distributors could have their own separate monitoring circuitry, or a shared monitoring circuitry for the system as a whole could be provided. In some examples the monitoring circuitry could permanently monitor for transfers of a particular virtual processor, but this may be less efficient in terms of power and so other examples may selectively enable and disable the monitoring circuitry. For example monitoring circuitry for a particular interrupt distributor could be enabled to monitor for transfer of a single specified virtual processor, or a limited number of specified virtual processors, and then later disabled once the monitoring is no longer required. For example for each of the monitored virtual processors a bit could be set if a transfer of that virtual processor to or from one of the subset of physical processors associated with the corresponding interrupt distributor is detected.

By providing the monitoring circuitry, then more sophisticated decisions on whether to continue attempting to make further attempts to resend the interrupt request can be made, taking into account whether a transfer involving a specified virtual processor has actually occurred.

When the interrupt distributor is acting as the target interrupt distributor which is dealing with an interrupt request forwarded from another further interrupt distributor, then on receiving a resent interrupt request from a given further interrupt distributor, when at least one earlier attempt was already made to send the interrupt request (or resent interrupt request) to the same target interrupt distributor, the cached virtual processor mapping information indicates that a target virtual processor specified by the resent interrupt request is not mapped to one of the subset of physical processors, and the monitoring circuitry is not already monitoring whether the target virtual processor has been subject to the transfer of mapping, then the interrupt distributor may control the monitoring circuitry to start monitoring of whether the target virtual processor is subject to the transfer of mapping. When starting monitoring, the tracking information may be cleared to indicate no transfer has yet been detected for the target virtual processor.

On the other hand, if (following at least one earlier attempt to send the interrupt request or resent interrupt request to the same target interrupt distributor) the resent interrupt request is received from the given further interrupt distributor, when the cached virtual processor mapping information indicates that the target virtual processor is not mapped to one of the subset of physical processors but the monitoring circuitry is already monitoring for transfer of the target virtual processor, then the interrupt distributor may check tracking information maintained by the monitoring circuitry to check whether it indicates that the transfer of mapping for the target virtual processor has been detected.

If the tracking information indicates that the monitoring circuitry has not detected a transfer of mapping for the target virtual processor, then an abort response can be provided to the given further interrupt distributor, in response to the resent interrupt request. This abort response could then trigger that further interrupt distributor to abort handling of the interrupt and instead trigger an error handling response action, as in this case the absence of any detection of transfer of mapping may indicate that something has gone wrong with the shared virtual processor mapping information which that given further interrupt distributor used to decide where to send the resent interrupt request, or an error has occurred in a control logic path.

On the other hand, if the tracking information is checked and indicates that the monitoring circuitry has detected a transfer of mapping for the target virtual processor then an abort may be premature, as following the detected transfer the shared virtual processor mapping information may have been updated so that if the given further interrupt distributor then updates its cached virtual processor mapping information and tries to resend the interrupt request again the interrupt may now reach its correct destination. Hence, the interrupt distributor may respond to the resent interrupt request by providing a rejection response to the given further interrupt distributor, to give another chance for the interrupt to be resent, and try to avoid the cost of the error handling response if possible.

Hence, with this monitoring approach this can allow more sophisticated decisions on whether it is worth continuing to attempt to resend interrupts or whether the interrupt request should be aborted.

The error handling response action (taken by an interrupt distributor in a case that an abort response is received from a further interrupt distributor in response to a resent interrupt request) may vary. In one example the error handling response action could be to generate a further interrupt of a type which indicates that action has to be taken in software to deal with the fact that the original interrupt request was not able to be routed to its correct destination. For example, the software could trigger a given target virtual processor to be remapped to a new physical processor and restarted so that any errors in the shared virtual processor mapping information relating to that particular target virtual processor can be repaired by updating it to specify the new physical location. This could deal with transient errors such as those caused by particle strikes. Alternatively, a processor reset may be triggered which may reset the data processing system to some default state and then execution may be restarted which may allow any errors to be dealt with. The particular error handling response action may depend on the nature of the software being executed.

The techniques discussed above can be implemented in a range of interrupt controller designs. In one example the interrupt distributor could be responsible for a subset of physical processors which comprises at least two physical processors. Alternatively, an interrupt distributor may only be responsible for a single physical processor. Also, in some examples at least one of the further interrupt distributors may be on a different integrated circuit to the interrupt distributor. These different integrated circuits could be manufactured separately, so that the integrated circuit which comprises the interrupt distributor could be made by one manufacturer but the further interrupt distributor could be on a separate integrated circuit manufactured by a separate manufacturer. Hence, the claimed apparatus including the interrupt distributor need not itself include the further interrupt distributors but could merely comprise an interface via which signals can then be routed to the further interrupt distributors. Hence, it is not essential for the further interrupt distributors to actually be part of the claimed apparatus. However in other examples the further interrupt distributors could be included in the same apparatus as the interrupt distributor. For example, at least one of the further interrupt distributors could be on a same integrated circuit as the interrupt distributor in some implementations.

FIG. 1 illustrates an example of a data processing system 2 having a number of integrated circuits (chips) 4 which are in communication with each other. Each chip includes a number of physical processor (CPUs) 6 and has some on-chip memory 8 accessible to the processor on that chip. Each chip may also have one or more device interfaces 10 from which messages may be received from a corresponding device in communication with that interface. For example, the device could be a peripheral device, input/output controller, network controller, etc. The number of physical processors and device interfaces 10 on each chip can vary from chip to chip. It will be appreciated that the particular number of chips shown in FIG. 1 is just one example. Other examples may only have a single chip or could have a greater number or smaller number of chips.

Each chip 4 has access to a shared memory 12 which can store data accessible to any of the chips 4. In the example of FIG. 1, the shared memory 12 is an off-chip memory, but in other examples the shared memory could instead be located on one of the chips 4 but be accessible to other chips 4. Data can be loaded from the shared memory 12 into the on-chip memory 8 of a particular chip. Individual physical processors 6 may also have caches which may cache data from either the on-chip memory 8 of that chip 4 or the shared memory 12. It will be appreciated that FIG. 1 is a simplified diagram, and many other features of the data processing system 2 may be provided although not shown.

In one example the data processing system 2 may be a virtualised server which may provide services such as web hosting, cloud services, database management or storage management.

An interrupt controller is provided to handle interrupts which require interruption of processing on one or more of physical processors. For example interrupts could be based on messages sent from a given device via the device interface 10. The interrupt controller is distributed, so that each of the chips 4 includes a respective general interrupt controller (GIC) 14 which is responsible for passing interrupts to the physical processors 6 on the corresponding chip. The GICs 14 on each chip are in communication with each other via an interrupt interconnect 16. The respective chips 4 may also be in communication with each other via a memory interconnect 18 which may also allow reading and writing of data in the shared memory 12. While in FIG. 1 the interrupt interconnect 16 and the memory interconnect 18 are shown as separate, in other examples these may be combined to form a shared interconnect used for both interrupts and memory accesses.

The data processing system 2 is a virtualised processing system and so is capable of executing a number of virtual processors (or virtual machines), with each virtual processor being able to be mapped to different physical processors of the system, including processors on different chips 4. Some virtual processors may require hardware features which are only provided on certain physical processors, so this may restrict which physical processor can have that virtual processor mapped to it, while other virtual processors may not have such restrictions. Decisions on mapping virtual processors to physical processors may be made by a hypervisor or other software element running on the processing system 2.

Figure 2:
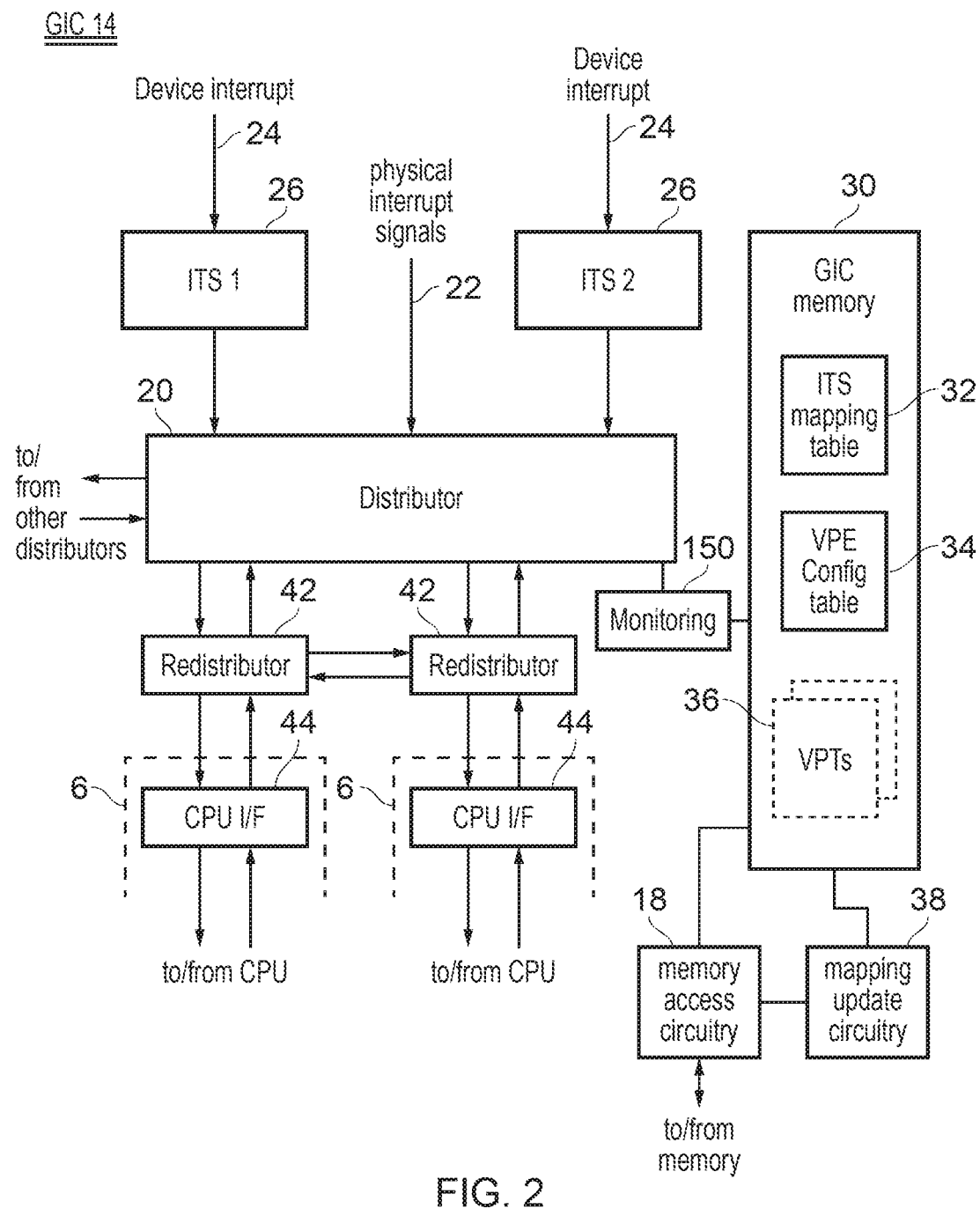
FIG. 2 shows an example of one of the interrupt controllers.

FIG. 2 shows an example of one of the GICs 14 which is responsible for distributing interrupts to the physical processors 6 on a given chip 4 and the virtual processors running on those physical processors 6. The GIC 14 includes an interrupt distributor 20 which is responsible for routing decisions on how to route a received interrupt request to the relevant physical processor which can handle the interrupt request. Interrupt requests received by the distributor 20 may include physical interrupt signals 22 which are asserted on wired paths of the apparatus 2. The interrupt requests may also include device interrupts 24 which are received from devices via the device interfaces 10. As the complexity of data processing systems grow, the increased number of on-chip interrupts may cause routing congestion and management complication if they are all associated with physical wired paths, and so for some systems a more efficient way of managing interrupt handling may be to use message based interrupts (such as the message signalled interrupts (MSI) used for device interfaces implemented using a PCI Express® bus). A message based interrupt may be a transaction which specifies a memory address, with the particular memory address specified representing the type of interrupt being asserted. This allows a single wired communication channel to be shared between a number of interrupt types distinguished by the respective addresses of the message. For message based interrupts received as device interrupts 24 from a given device interface 10, an interrupt translation service (ITS) circuit 26 may translate the message into the appropriate interrupt type, by looking up the address specified by the message in a table defining the various interrupt types associated with different addresses. For example the interrupt translation service may generate an interrupt ID from the message received from the device and may identify which particular target processor should handle the interrupt, which could be a physical processor or a virtual processor. A virtual processor may also be called a "virtual processing element", or VPE for short.

The GIC 14 has memory access circuitry 18 which controls reading and writing of data from/to the shared memory 12 or on-chip memory 8 of the corresponding chip 4. The GIC 14 may also have some internal memory 30 which can be used to cache various tables or other information read from the on-chip memory 8 or the shared memory 12. The internal memory 30 stores an ITS mapping table 32 which is used by the ITS 26 to map a message based interrupt to the interrupt ID and target physical or virtual processor. The GIC memory 30 may also cache a VPE configuration table 34 which may correspond to the cached virtual processing mapping information as discussed above, and indicates which physical processor in the overall system 2 a given virtual processor is mapped to. The VPE configuration table 34 may potentially be out of date and differ from a corresponding set of information stored as shared virtual processing mapping information within the off-chip memory 12 which is accessible to all of the GICs 14 in the system. For example this shared information could be a set of virtual processor tables (VPTs) 36, which are described in more detail below. Although the VPTs primarily reside within the shared memory 12, some VPTs, or parts of VPTs, could optionally be cached within the GIC memory 30. The GIC 14 also has mapping update circuitry 38 for controlling updates of the VPE configuration table 34 and the VPTs 36. As shown in FIG. 2, the GIC 14 may also have monitoring circuitry 150 for monitoring whether a specified VPE has been subject to a transfer of physical processor.

The distributor 20 uses the VPE configuration table 34 to decide how to route the interrupts 22, 24 to their respective destinations. If the VPE configuration table 34 indicates that a particular VPE targeted by an interrupt is mapped to one of the CPUs 6 for which that GIC 14 is responsible, then the interrupt can be routed to the corresponding physical processor 6. If the target virtual processor is mapped to a CPU 6 on a different chip 4, for which a different GIC 14 is responsible, then the distributor 20 may route the interrupt over the interrupt interconnect 16 to a further interrupt controller 14 on the other chip 4, which can then pass it on to the required physical processor.

For distributing interrupt requests to the processors which a given GIC 14 is responsible for, each physical processor 6 may have a corresponding redistributor 42 which is responsible for routing the signals to that physical processor, and is in communication with the distributor which makes more global decisions. The redistributor 42 may be responsible for controlling exchange of signals with a particular physical processor, and may communicate with a CPU interrupt interface 44 which is within the corresponding physical processor 6.

Figure 3:
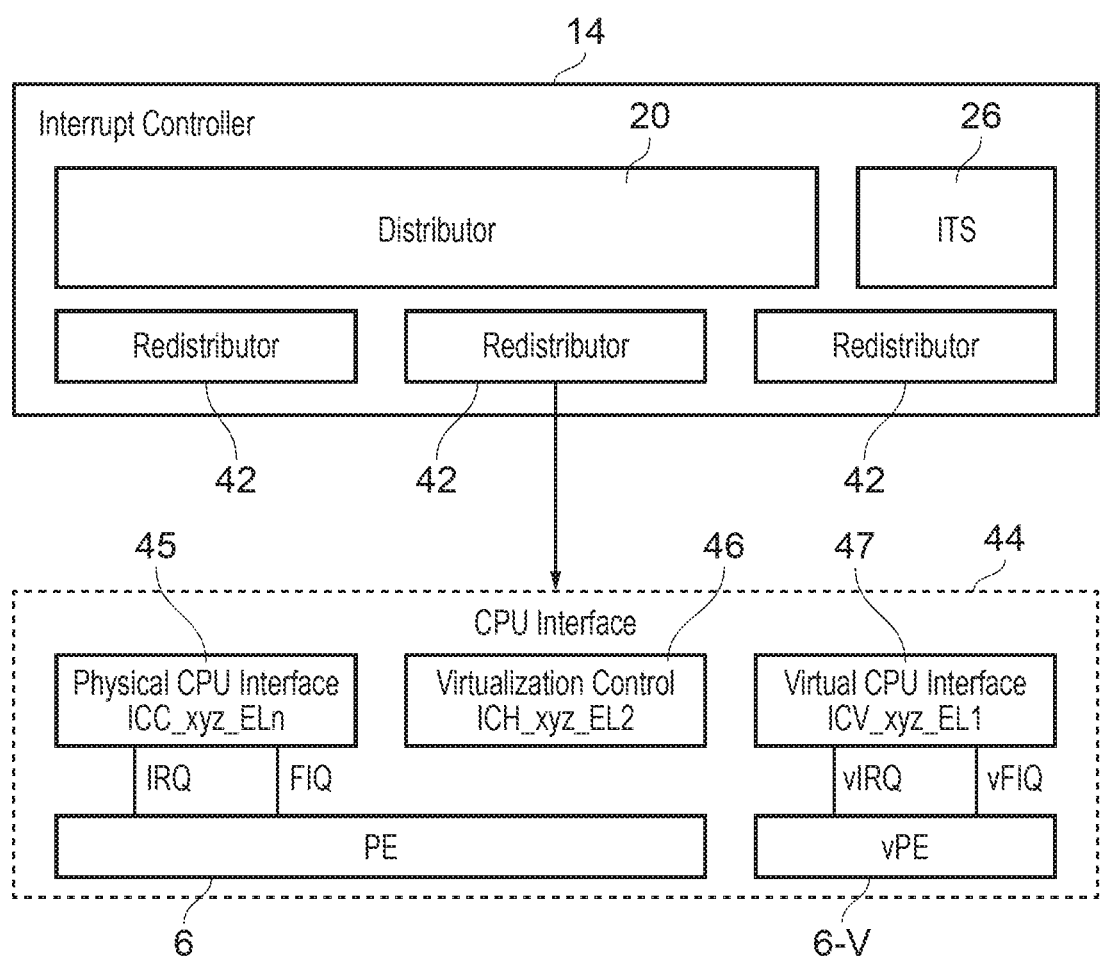
FIG. 3 shows components of a processor interface in a physical processor for receiving interrupts from the interrupt controller.

FIG. 3 shows in more detail components of the CPU interface 44 for a particular physical processor 6, which is responsible for dealing with physical and virtual interrupt requests to be handled by the physical processor or the virtual processor executing on the physical processor. The CPU interface component 44 includes a physical CPU interface 45 module which is used by a hypervisor executing on the physical CPU 6 for interfacing with physical interrupts, a virtual CPU interface 47 for use by a virtual processor (VPE) 6-v (implemented using a virtual machine executing on the physical CPU 6 under control of the hypervisor) to handle virtual interrupts, and a virtual interface control module 46 for the hypervisor to configure how the virtual CPU interface 47 operates.

The Interrupt Translation Service (ITS) 26 module is responsible for translating message-based interrupts (MSI) from peripherals into Locality-specific Peripherals interrupts (LPI). Locality-specific Peripheral Interrupts (LPIs) are edge-triggered message-based interrupts targeting a redistributor 42 and connected PE 6. One use case for the ITS is translating MSI messages from a PCIe Root Complex (RC). When performing a translation, the ITS is supplied with a DeviceID, which is derived from the PCIe Requester ID, and selects an interrupt namespace associated with that device. This allows two VMs to "live" in their own worlds without having to use mutually-exclusive interrupts. For instance, VM A can use IRQ number 123 and VM B's IRQ number 123 can be regarded as totally unrelated.

The CPU interface registers contain physical interface registers 45 and virtual interface registers 47 as well as virtualization control registers 46. The hypervisor executing at EL2 can program the physical CPU interrupt interface 45 to handle physical interrupts. The hypervisor has access to additional control registers 46 for performing tasks such as programming the virtual CPU interface 47, accessing virtual register state to enable context switching, configuring and controlling virtual interrupts.

Figure 4:
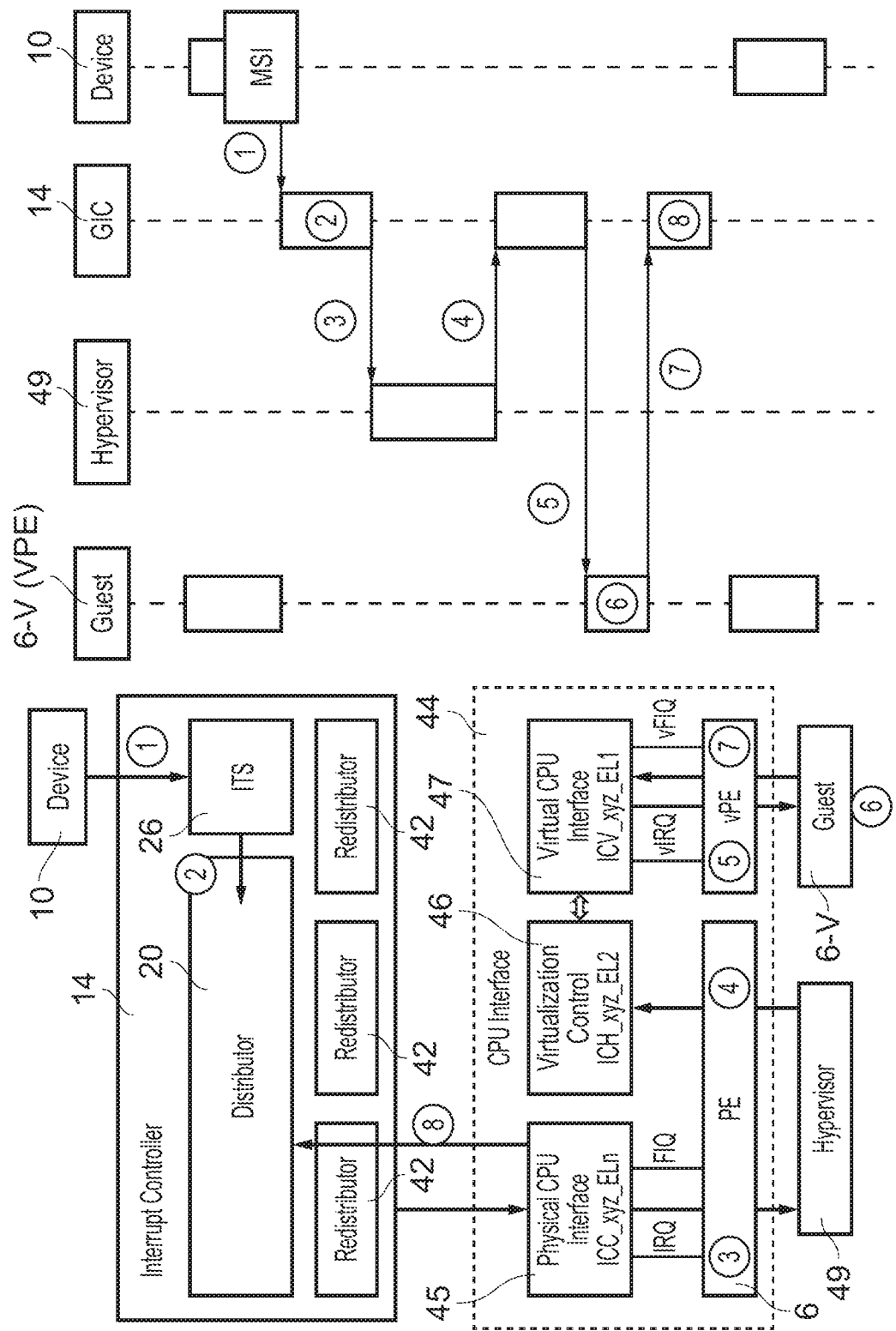
FIG. 4 schematically illustrates handling of an interrupt request to be handled by a target virtual processor.

When a virtual interrupt is asserted, targeting a specific guest OS (VPE) 6-v, the exception can be handled by the GIC associated with the physical processor (PE) 6 to which that VPE is mapped, as illustrated in FIG. 4 which shows the following sequence:
1) MSI received from physical device interface 10 to GIC ITS 26.
2) GIC ITS 26 derives interrupt ID for targeted Guest, and signals a physical interrupt (IRQ) to the relevant CPU via the distributor 20 and redistributor 42 associated with that CPU 6. If the interrupt (IRQ) is configured as virtual (by the Hypervisor 49), the physical CPU 6 takes a hypervisor (HYP) exception.
3) The hypervisor 49 reads the interrupt status from the Physical CPU Interface 45.
4) The hypervisor 49 makes an entry in list registers provided in the virtual CPU interface 47. The list registers provide data characterising a list of uncompleted interrupts for an associated VPE 6-v.
5) The guest OS running on the target VPE 6-v reads the interrupt status from the Virtual CPU Interface 47.
6) The guest OS processes the (virtual) IRQ in a similar way to processing a physical interrupt (by branching to execution of a corresponding interrupt handling routine).
7) The guest OS acknowledges and clears the virtual CPU interface interrupt
8) The physical CPU interface 45 signals that the corresponding physical interrupt can be cleared at the GIC 14.

FIGS. 3 and 4 show one example of handling of an interrupt targeting a virtual processor. It will be appreciated that this is just one example and another approach could also be used. The techniques for routing interrupts to a target virtual processor described below can be used in systems which use a different signalling mechanism at the interface between a GIC and the CPU interface 44 for a particular physical processor.

Figure 5:
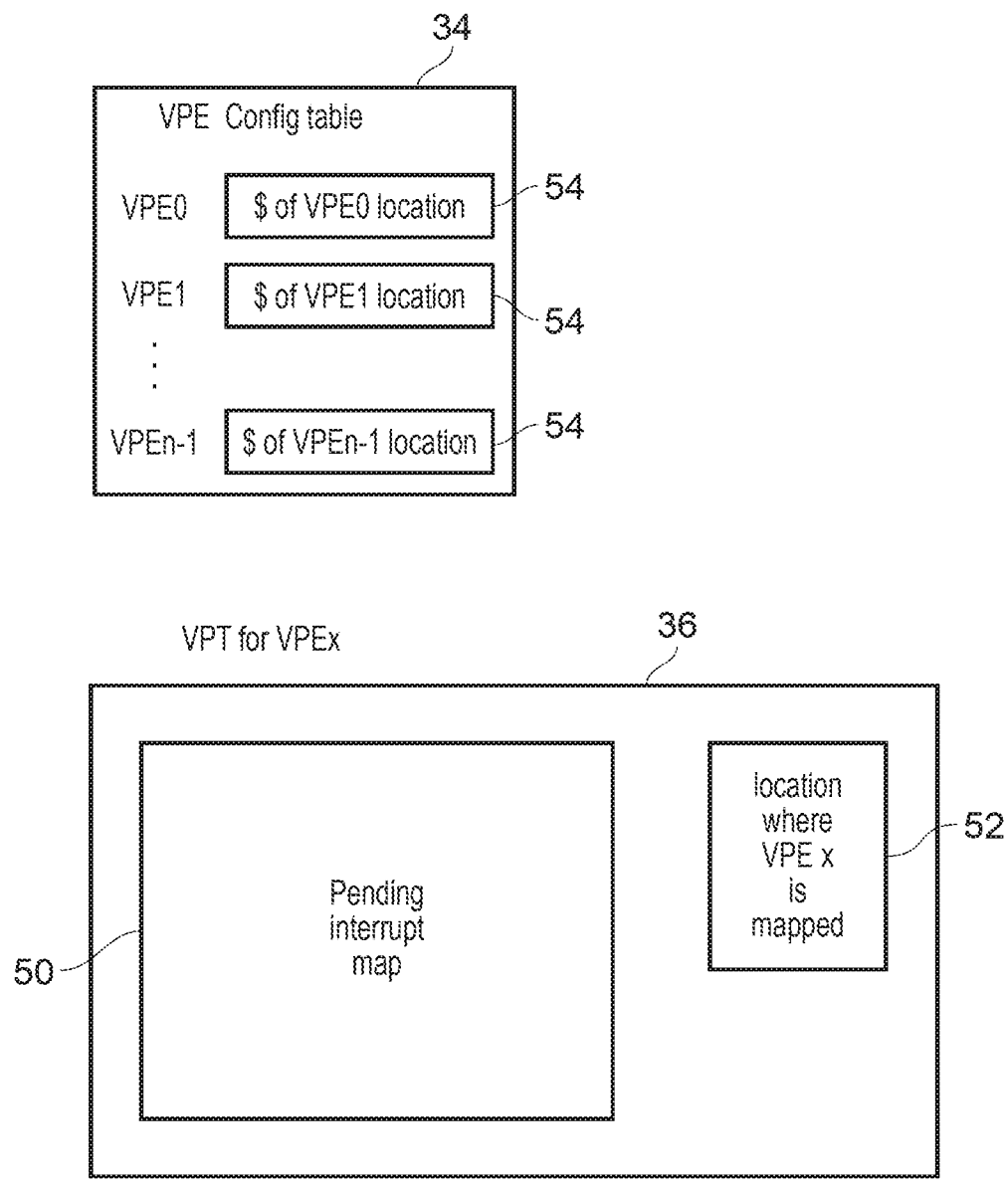
FIG. 5 illustrates an example of cached virtual processor mapping information and shared virtual processor mapping information.

FIG. 5 shows in more detail an example of the VPE configuration table 34 (cached virtual processing mapping information) and the virtual processor table (VPT) 36 for a particular virtual processor, VPEx. The VPT for virtual processor VPEx specifies a pending interrupt map 50 which maintains a record of the types of interrupts which have been received targeting that particular virtual processor. This can be used to track any interrupts which may have been received while the virtual processor VPEx was not resident. When the virtual processor VPEx later becomes resident again, the pending interrupt map 50 can be searched and any pending interrupts which are still asserted can be serviced using the VPEx as if they had occurred while the virtual processor was running.

The VPT 36 may also specify a VPEx location identifier 52 which identifies the physical location at which the virtual processor is mapped (e.g. using a physical processor indicator 52, which identifies the particular physical processor 6 to which the virtual processor is mapped). Note that this does not necessarily imply that the virtual processor is resident and currently being executed, but simply indicates the physical processor that has been allocated for executing that virtual processor (the VPEx could be non-resident).

It will be appreciated that the VPT 36 could also include other information not shown in the example of FIG. 5.

Each virtual processor may have a separate VPT 36 which may be stored in shared memory 12. Parts of the VPTs for respective virtual processors could be cached within CPU caches or the on-chip memory 8 of a given chip 4, or within the internal GIC memory 30 for a particular interrupt controller 14.

The VPE configuration table 34 represents a set of cached information derived from the VPTs for a number of virtual processors. The VPE configuration table 34 may have a number of entries 54 for respective virtual processors. Each entry is based on the physical location indicator 52 of the corresponding VPT 36 for the corresponding virtual processor. The mapping update circuitry 38 may update the cached entry 54 for a given virtual processor when that virtual processor is either transferred away from a physical processor for which the corresponding GIC is responsible or is transferred to a physical processor for which that GIC 14 is responsible, but may be out of date if a transfer of that VPE involving other physical processors for which the corresponding GIC was not responsible has been performed. Hence, sometimes the cached location indication 54 for a given virtual processor in the VPE configuration table 34 may be out of date compared with the location indicator 52 in the VPT 36 maintained in the shared memory 12.

Note that the location indicator 52 in the VPT may indicate the specific physical processor 6 to which a VPE is mapped. However in the VPE configuration table 34 it is not essential for the cached information to actually indicate the specific physical processor 6 at which the corresponding VPE is mapped. Although this is one embodiment, in other embodiments, for VPEs which are mapped to a physical processor on a different chip from the chip associated with the GIC 14 having a particular instance of the VPE configuration table 34, the indicator 54 in the VPE configuration table could simply indicate that the VPE is mapped to a different chip and could specify an identifier of the other chip to which the interrupts for that VPE should be sent. For example the GIC on chip 0 could specify specific processor indicators for VPEs mapped to the processors 6 on chip 0, but for other VPEs mapped to processors 6 on that they are on one of the chips 1, 2 or 3 could merely indicate the chip identifiers which gives enough information to allow the GIC 14's distributor 20 to route the interrupts for a VPE to the appropriate location. Other examples may actually record a specific processor identifier in the entries 54 of the VPE configuration table 34.

It will be appreciated that the VPE configuration table 34 shows one example of how the GIC can maintain cached virtual processor mapping information, derived from the shared virtual processor mapping information stored in the VPTs 36 in shared memory 12. However, other implementations could represent the cached virtual processor mapping information in a different format.

Figure 6:
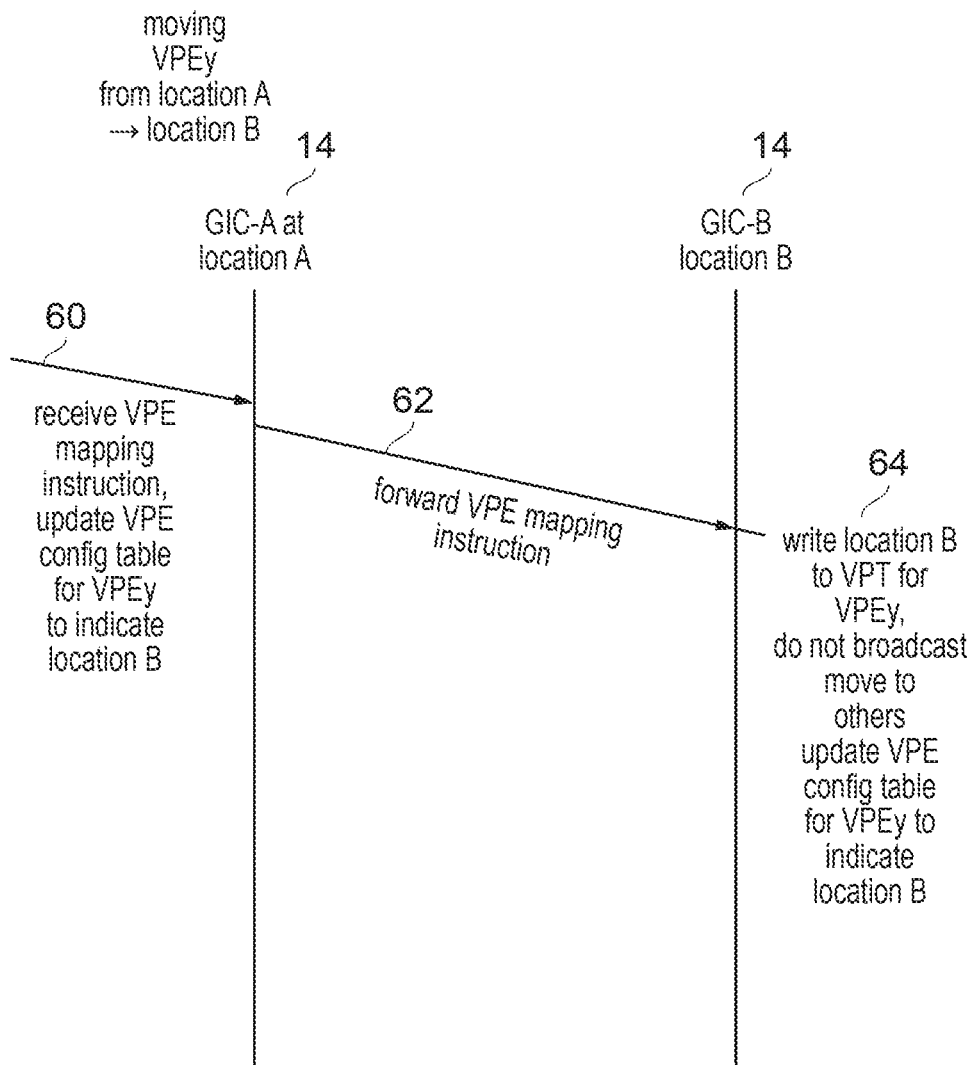
FIG. 6 illustrates updating of cached virtual processor mapping information and shared virtual processor mapping information in response to a virtual processor transfer command.

FIG. 6 illustrates operations performed when a virtual processor VPEy is moved from a first location A to a second location B within a system. The first and second locations may be a source processor 6 and a destination processor 6 which could either be in the same chip 4 or on different chips 4 of the overall data processing system 2.

At step 60 the GIC 14 associated with the chip 4 which comprises the location A receives a virtual processor mapping instruction which indicates that the virtual processor VPEy is being moved to location B. In response, the GIC associated with location A updates its VPE configuration table 34 to indicate that VPEy is now mapped to a processor at location B (as mentioned above this could either be a specific processor indication or an indication of which GIC to send interrupts to if that processor is on a different chip). Also, at step 62 the GIC associated with location A forwards the VPE mapping instruction to indicate that VPEy is being transferred to location B. Note that the actual transfer of the VPE between the processors at locations A and B may be carried out separately from the signalling performed by the interrupt controller 14, or could be performed in response to the instruction received at the interrupt controller associated with location A. Hence, the transfer of interrupt responsibility could either be directly triggering the virtual processor remapping or could be a separate process for maintaining the interrupt counting tracking information 34, 36, performed in parallel with the VPE transfer itself.

When the forwarded VPE mapping instruction is received at the interrupt controller 14 associated with location B then at step 64 that interrupt controller 14 controls its mapping update circuitry 38 to update the VPT 36 associated with virtual processor VPEy to indicate that the physical location where that virtual processor is mapped is now the destination processor at location B. Hence the location indicator 52 is updated at location B by the interrupt controller 14 associated with location B. The mapping update circuitry 38 associated with the source location A does not request any update of the VPTs 36, as this is being handled by the mapping update circuitry 38 associated with location B.

Also, in response to the VPE mapping instruction both the interrupt controllers 14 at location A and location B update their respective VPE configuration tables 34 to indicate that VPEy is now mapped to a processor at location B. If locations A and B were actually processors for which the same interrupt controller is responsible then this would only be a single update to the VPE configuration table 34 in one interrupt controller. However if A and B are on different chips then two different interrupt controllers 14 may update their mapping information in the VPE configuration table 34. However, this update is not broadcast to any other interrupt controllers 14 associated with chips which do not contain either the source processor A or the destination processor B between which the virtual processor VPEy is being moved. This avoids the overhead of exchanging many messages with other interrupt controllers 14, and the associated performance cost of blocking handling of interrupts for the target virtual processor while this messaging is being carried out. Hence, this could result in some of the interrupt controllers 14 holding cached information in their VPE configuration table 34 which is out of date following the transfer of virtual processor VPEy, and so it is possible that when an interrupt is received from a device interface 10 and the ITS 26 determines that it targets virtual processor VPEy, this interrupt could end up being routed to the wrong GIC 14 because the VPE configuration table 34 is out of date.

Figure 7:
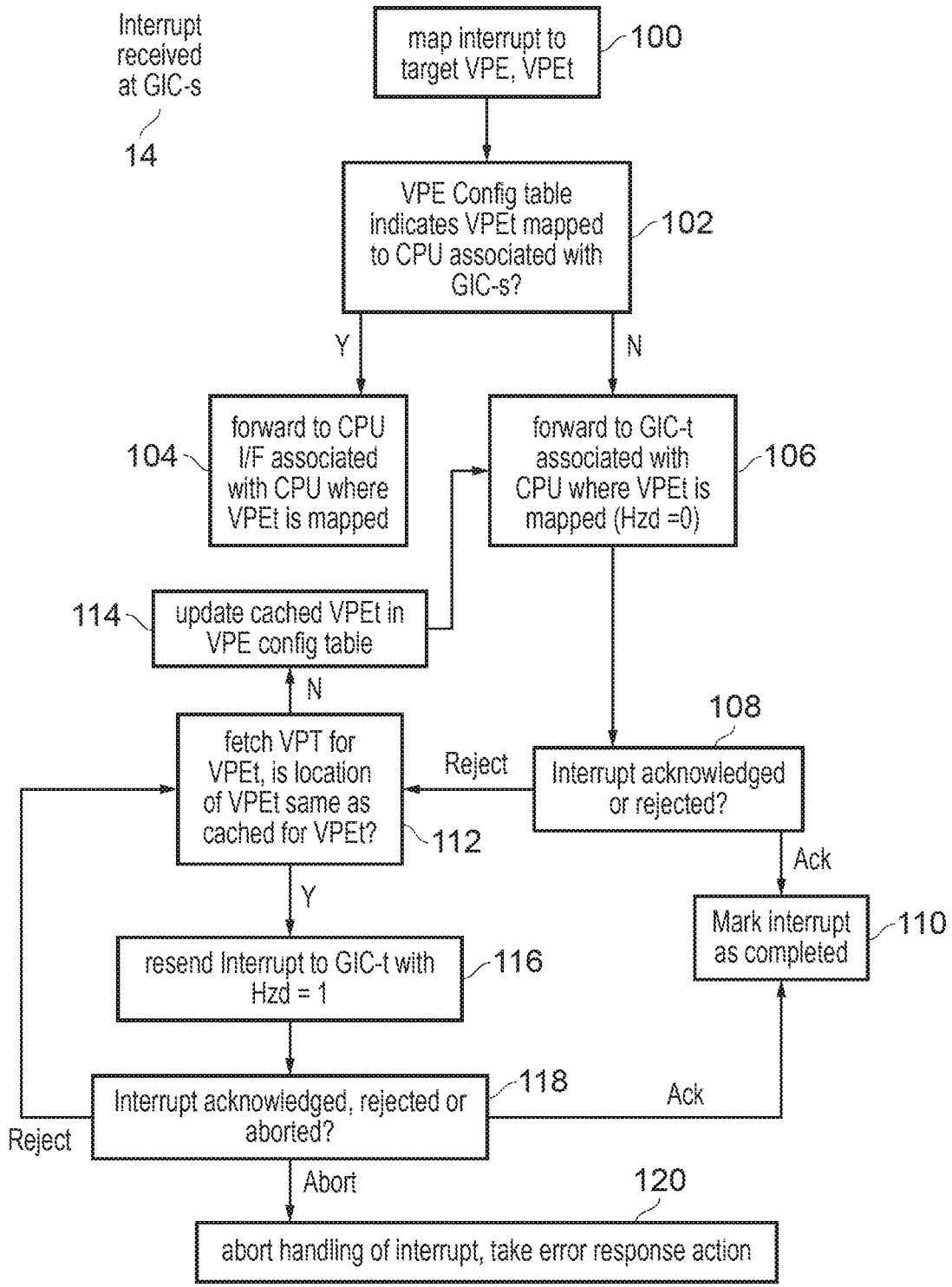
FIG. 7 is a flow diagram illustrating handling of an interrupt request received at a source interrupt controller.
Figure 8:
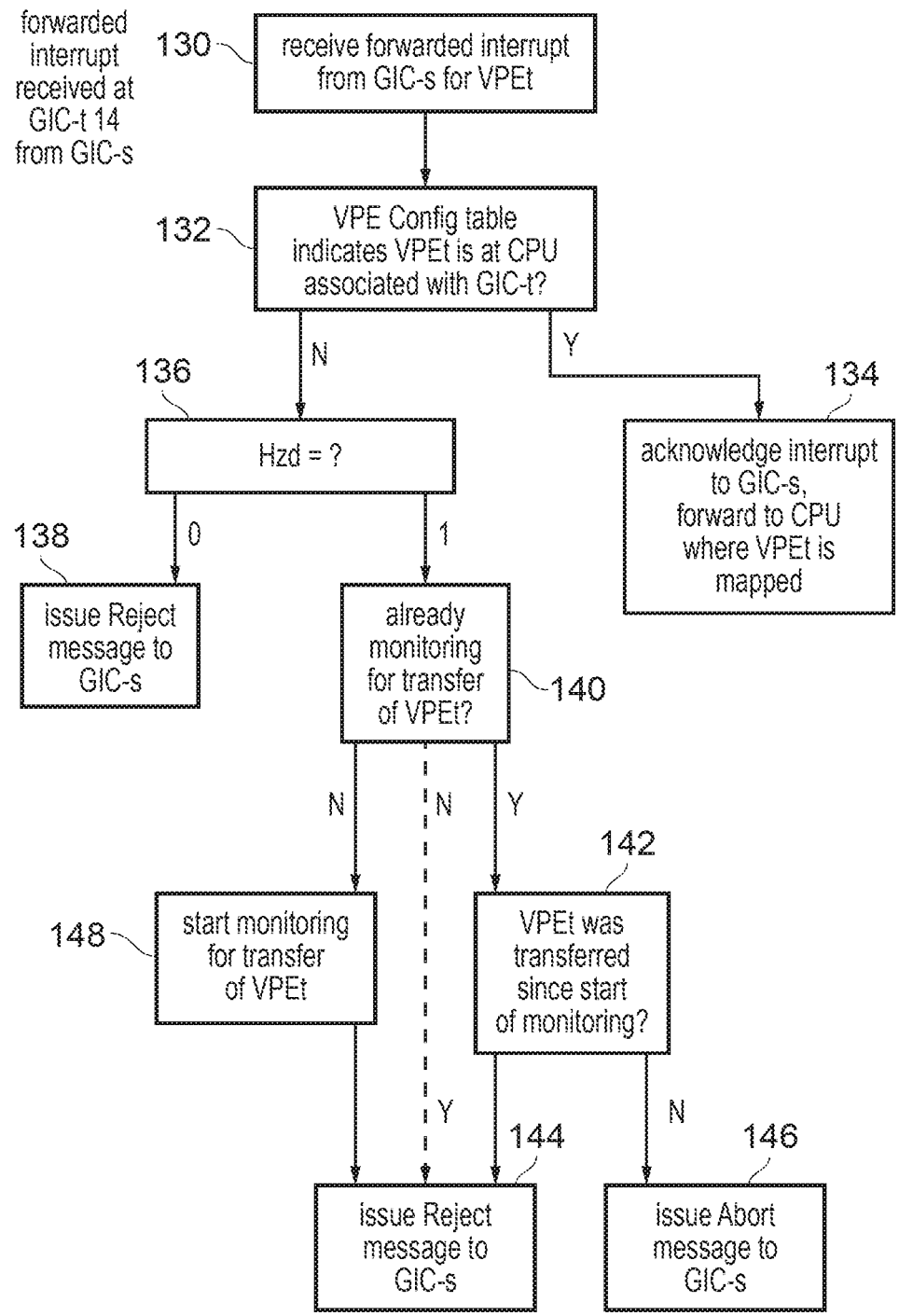
FIG. 8 is a flow diagram showing processing of a forwarded interrupt received at a target interrupt controller after being routed from the source interrupt controller.

FIGS. 7 and 8 show flow diagrams illustrating an interrupt resending mechanism which can be used to deal with the fact that the VPE configuration table 34 may be out of date. FIG. 7 shows the operations performed at a source interrupt controller 14, labelled GIC-s, which refers to the interrupt controller 14 at which the interrupt was originally received from a device 10. The interrupt request targets a particular virtual processor, VPEt, referred to as a target virtual processor. If the interrupt has to be forwarded to a different interrupt controller (GIC) 14 on a different chip because the target virtual processor VPEt is mapped to a physical processor for which the source interrupt controller GIC-s is not responsible, then the interrupt can be forwarded to another interrupt controller, which is referred to as the target interrupt controller, GIC-t. FIG. 8 shows the operations performed at the target interrupt controller GIC-t.

Note that any given interrupt controller 14 may sometimes act as the source interrupt controller GIC-s as shown in FIG. 7 and at other times act as the target interrupt controller GIC-t as shown in FIG. 8. Each interrupt controller 14 may support both functions depending on whether it is receiving an interrupt directly from an interrupt source on that chip or is receiving an interrupt forwarded from another chip.

At step 100 of FIG. 7 the source interrupt controller GIC-s receives the interrupt request via the ITS 26 from a given device interface 10, with an indication of the target virtual processor VPEt which is to handle that interrupt. At step 102 the distributor 20 of GIC-s 14 checks its VPE configuration table 34 to check whether the target virtual processor VPEt is mapped to one of the physical processors 6 which is associated with the source interrupt controller GIC-s. If so, then at step 104 the distributor 20 can forward the interrupt request via the redistributor 42 to the processor interface 44 associated with a particular physical processor 6 to which the VPEt is mapped (e.g. using the approach shown in FIGS. 3 and 4).

On the other hand, if the VPE configuration table 34 indicates that VPEt is mapped to a processor on a different chip, for which GIC-s 14 is not responsible, then at step 106 the distributor 20 distributes the interrupt request to the target interrupt controller GIC-t which is responsible for the particular physical processor where the VPE configuration table 34 indicates VPEt is mapped. As this is the first attempt to send the interrupt request to the target interrupt controller GIC-t, a hazard flag in the forwarded interrupt request is set to 0 to distinguish from later attempts to resend the same interrupt to the same GIC 14 (if necessary).

At step 108 the source interrupt controller GIC-s determines whether, in response to the forwarded interrupt, the target interrupt controller GIC-t has acknowledged the interrupt request (indicating that it is responsible for the physical processor on which the VPEt is mapped) or has rejected the interrupt request (if the target interrupt controller GIC-t considers that VPEt is not mapped to any of the physical processors 6 for which it is responsible).

If an acknowledgement response has been received from GIC-t, then at step 110 the source interrupt controller GIC-s can mark the interrupt as completed and the method ends.

However, if a rejection response was received from GIC-t, then following step 108 the method proceeds to step 112 where the distributor 20 of GIC-s controls the mapping update circuitry 38 to request an update of the VPE configuration table 34 in its internal memory 30, based on the VPT 36 stored in the shared memory 12. If the VPT 36 for VPEt has been updated since the corresponding piece of information was recorded in the VPE configuration table 34 of GIC-s, it could now indicate that a different CPU is mapped to VPEt. Once the relevant information has been refetched from the VPT 36 associated with target virtual processor VPEt, the mapping update circuitry 38 of GIC-s checks whether the physical processor location associated with VPEt in the VPT 36 is the same as the location previously indicated in the cached information 54 for target virtual processor VPEt in the VPE configuration table 34. If not, then at step 114 the mapping update circuitry 38 updates the cached information 54 for VPEt in the VPE configuration table 34 to match what was indicated in the fetched VPT and then at step 106 the distributor 20 resends the interrupt request to the target interrupt controller GIC-t associated with the physical processor to which the updated cached VPE information 54 indicates VPEt is mapped. Note that as the VPE configuration table 34 has been updated since the first pass through step 106, this resent interrupt request may be sent to a different interrupt controller compared to the first time. If resending the interrupt request to a different GIC 14 to the previous attempt, the hazard flag may be set to 0 to indicate that this is the first attempt to send the interrupt to that particular GIC 14.

On the other hand, if at step 112 it was determined that the fetched VPT actually indicates the same physical location for target virtual processor VPEt as previously cached, then this would indicate that there has been no transfer of VPEt since the previous attempt to forward the interrupt request, which may indicate the possible presence of an error. To provide a mechanism to avoid deadlock, at step 116, if the cached information still matches the fetched information from the VPT 36 then the interrupt request is sent to the same target interrupt controller GIC-t again, but this time the resent interrupt request specifies a hazard flag equal to 1, to distinguish from the first attempt to send the interrupt request to that interrupt controller at step 106.

If the interrupt was sent with hazard flag asserted at step 116, then at step 118 the interrupt distributor 20 at GIC-s determines whether the target interrupt controller GIC-t has responded with an acknowledgement response, a rejection response or an abort response. If the received response is an acknowledgment response then this indicates that the interrupt has now been successfully routed and so again at step 110 the interrupt can be marked as completed. If a rejection response is received, then the method returns to step 112 to attempt again to refetch the shared processor mapping information from the relevant VPT 36 and check again whether it has changed relative to the cached information, as the rejection response indicates that the target interrupt controller GIC-t is of the opinion that there may be a chance of a further attempt at succeeding (e.g. because its monitoring circuitry 150 has detected a transfer of VPEt as discussed further below).

However, if an abort response is received from GIC-t then at step 120 handling of the current interrupt is aborted and an error response action is taken. This error response action could be the signalling of a further interrupt to cause software to step in and deal with the fact that the interrupt received at step 100 could not be successfully routed, or could be an action taken to reset the processing system 2 to a default state or to trigger remapping of virtual processor VPEt to a different physical processor in the hope that this could result in any error in the VPT 36 being corrected.

FIG. 8 illustrates operations performed at the target controller GIC-t when it receives the forwarded interrupt sent at steps 106 or 116 of FIG. 7. At step 130 the forwarded interrupt (which could be the original attempt to send the interrupt or a resent attempt) is received at GIC-t. The forwarded interrupt request specifies the target virtual processor VPEt which is to handle the interrupt request. At step 132 the interrupt distributor 20 in the target interrupt controller GIC-t checks its VPE configuration table 34 and determines whether the target VPEt is mapped to a physical processor for which the target interrupt controller GIC-t is responsible. If so, then at step 134 the target interrupt controller GIC-t returns an acknowledgement response to the source interrupt controller GIC-s and passes the interrupt request to the redistributor 42 to forward the interrupt request to the physical processor where the target virtual processor VPEt is mapped.

If at step 132 the target interrupt controller GIC-t determines (based on its VPE configuration table 34) that the target virtual processor VPEt is mapped to a physical processor for which the target interrupt controller GIC-t is not responsible, then at step 136 the distributor 20 of GIC-t checks the hazard flag set in the forwarded interrupt received from the source interrupt controller GIC-s. If the hazard flag is 0 then this is the first attempt to send the interrupt request to that particular target interrupt controller GIC-t and so at step 138 a rejection response is returned so that the source interrupt controller can attempt to refetch the information from the VPT 36 and resend the interrupt.

If the hazard flag is set to 1, then this indicates that there has already been a previous attempt to send the same interrupt to the same target interrupt controller GIC-t. At step 140 the distributor checks whether the monitoring circuitry 150 of the target interrupt controller GIC-t is already monitoring for a transfer of the target virtual processor VPEt. For example, the monitoring circuitry 150 may have a register that can be updated to specify the virtual processor identifier of a particular virtual processor and an enable indicator indicating whether monitoring is enabled for that virtual processor. When monitoring is enabled for a particular virtual processor, then if a virtual processor mapping instruction for that particular virtual processor is received by the interrupt controller 14 (acting as either the interrupt controller responsible for the source physical processor from which the corresponding virtual processor is transferred or the destination processor to which the virtual processor is being transferred), then the monitoring circuitry 150 may set a "transferred" indication to indicate that a transfer has been detected. If monitoring is disabled then no update of the transferred indication is performed, even if a transfer involving the particular virtual processor occurs. In some implementations, the monitoring circuitry 150 may only support monitoring for a single virtual processor at a time, while other implementations could monitor two or more different virtual processors for transfer at a time.

If at step 140 it is determined that the monitoring circuitry 150 was already monitoring for transfer of the target virtual processor VPEt, then at step 142 the distributor 20 of GIC-t checks whether the transferred indication is set to indicate that target virtual processor VPEt was transferred since the start of monitoring. If the virtual processor has been transferred, then there is a chance that if a rejection message is sent then the next attempt to resend the interrupt may find the correct location, and so it is worth allowing interrupt handling of this particular interrupt controller to continue without an abort. Hence, at step 144 the distributor 20 in GIC-t 14 issues a rejection message to GIC-s.

On the other hand, if the transferred indicator of the monitoring circuitry 150 of GIC-t indicates that VPEt was not transferred since the start of monitoring, then at step 146 an abort message is provided to the source interrupt controller GIC-s, to indicate that handling of the interrupt should be aborted, as an error may have arisen which could otherwise lead to deadlock if continued attempts are made to resend the interrupt message.

If at step 140, it was determined that the monitoring circuitry 150 of GIC-t was not already monitoring for transfer of the specified target VPEt, then at step 148 the monitoring circuitry 150 may start monitoring for transfer of the target VPEt, assuming there is spare resource in the monitoring circuitry 150 which is not already being used for monitoring another virtual processor. If there is not enough resource to allow monitoring to start for the target virtual processor, then as shown in the dotted line in FIG. 8 step 148 can be omitted. Regardless of whether step 148 is performed or not, in the case where there is no existing monitoring for the target virtual processor VPEt, at step 144 the rejection message is sent as a response to the source interrupt controller GICs.

Figure 9:
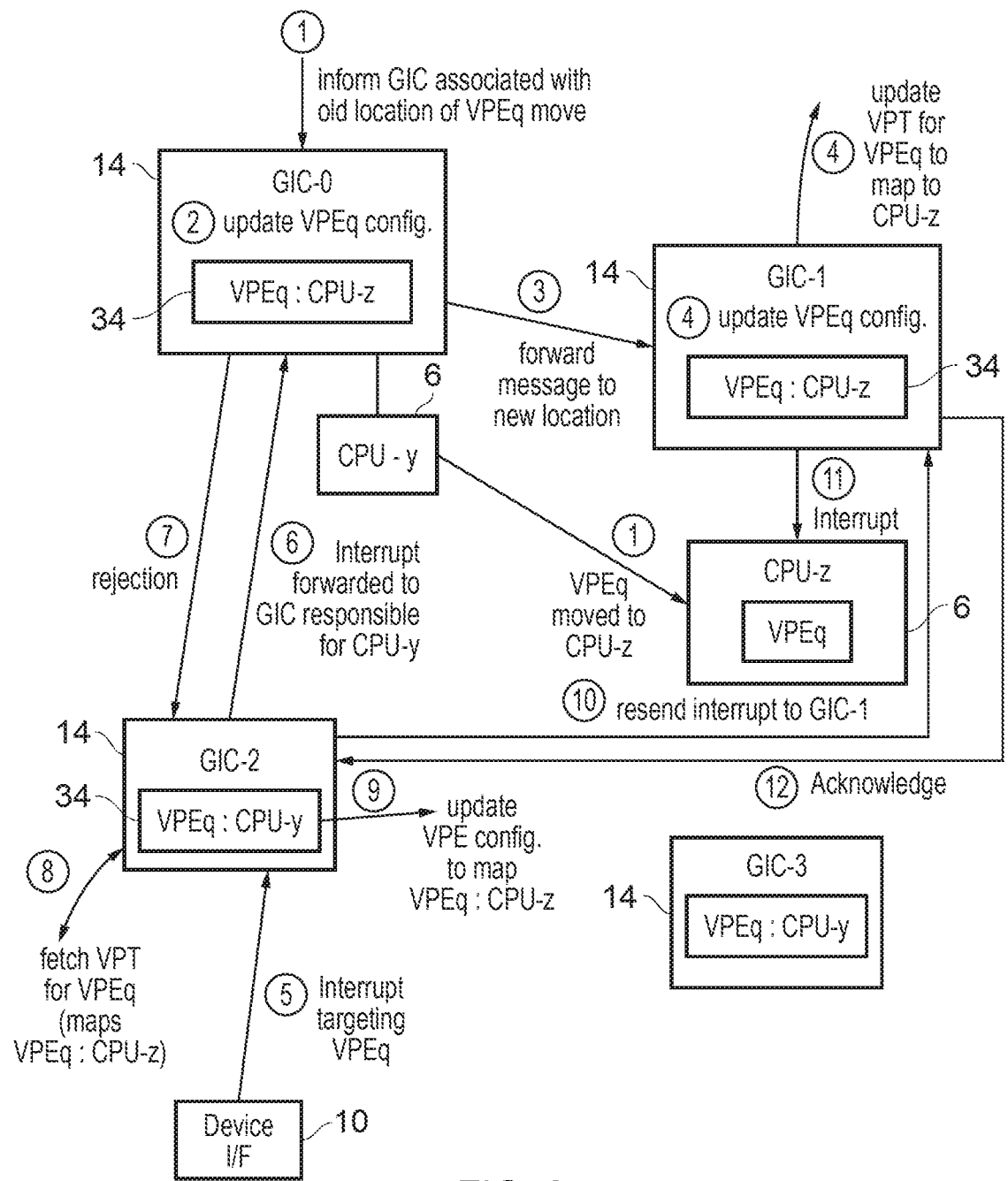
FIG. 9 schematically illustrates an example of handling an interrupt request after a transfer of a virtual processor from one physical processor to another.

FIG. 9 shows an example of using the approach shown in FIGS. 6, 7 and 8 to handle passing of interrupts in the system shown in FIG. 1. At step 1 of FIG. 9, GIC-0 on chip 0 is informed of the transfer of a given virtual processor VPEq being moved from a physical processor CPU-y which is on chip 0 to a destination physical processor CPU-z which is on chip 1. At step 1 the actual transfer of the virtual processor occurs, in parallel with the communication between the interrupt controllers. The responsibility for the actual transfer of the VPE may be managed by software, and may not need to be carried out directly by the interrupt controllers 14 themselves.

At step 2 of FIG. 9, in response to receiving the VPE mapping instruction informing GIC-0 of the new location for VPEq, the VPE configuration table 34 in interrupt controller GIC-0 is updated so that it now indicates that VPEq is mapped to CPU-z on chip 1 (similar to step 60 of FIG. 6).

At step 3 of FIG. 9, the VPE mapping instruction is forwarded to the interrupt controller GIC-1 which is responsible for the physical processor which is the new location for the virtual processor (see step 62 of FIG. 6), and in response, at step 4 of FIG. 9 GIC-1 updates both its cached information in the VPE configuration table and the shared information in the VPT 36 for virtual processor VPEq within shared memory 12 to indicate that VPEq is now mapped to a physical processor CPU-z (as at step 64 of FIG. 6). Hence, following processing of VPE mapping instruction, the interrupt controllers GIC-0 and GIC-1 now have updated cached mapping information for VPEq, but interrupt controllers GIC-2 and GIC-3 still have the out of date information indicating that VPEq is mapped to CPU-y.

At step 5 of FIG. 9, an interrupt targeting VPEq is received from a device interface 10 by the interrupt controller GIC-2 on chip 2. As its cached mapping information 34 indicates that VPEq is mapped to CPU-y, at step 6 GIC-2 forwards the interrupt request to GIC-0 which is responsible for CPU-y where GIC-2 determines the target virtual processor VPEq is executing (as described at step 106 of FIG. 7). However, on checking its cached information 34, GIC-0 determines that it is not responsible for the physical processor to which VPEq is mapped and so replies with a rejection response at step 7 of FIG. 9 (corresponding to step 138 of FIG. 8).

At step 8 of FIG. 9, in response to the rejection response, GIC-2 fetches the VPT 36 associated with target processor VPEq from memory and determines from the refetched information that VPEq is now mapped to CPU-z on chip 1. At step 9, GIC-2 updates its local cached information 34 based on the new mapping. At step 10, GIC-2 resends the interrupt request to GIC-1 which is responsible for CPU-z (corresponding to a second pass through step 106 of FIG. 7). This time, when GIC-1 checks its local cached mapping information 34 it determines that it is responsible for the physical processor CPU-z responsible for the target virtual processor VPEq, and so GIC-1 routes the interrupt at step 11 to the physical processor CPU-z to handle the interrupt. At step 12 of FIG. 9, an acknowledgment response is returned to GIC-2 to indicate that the interrupt has now been serviced (corresponding to step 134 of FIG. 8).

Figure 10:
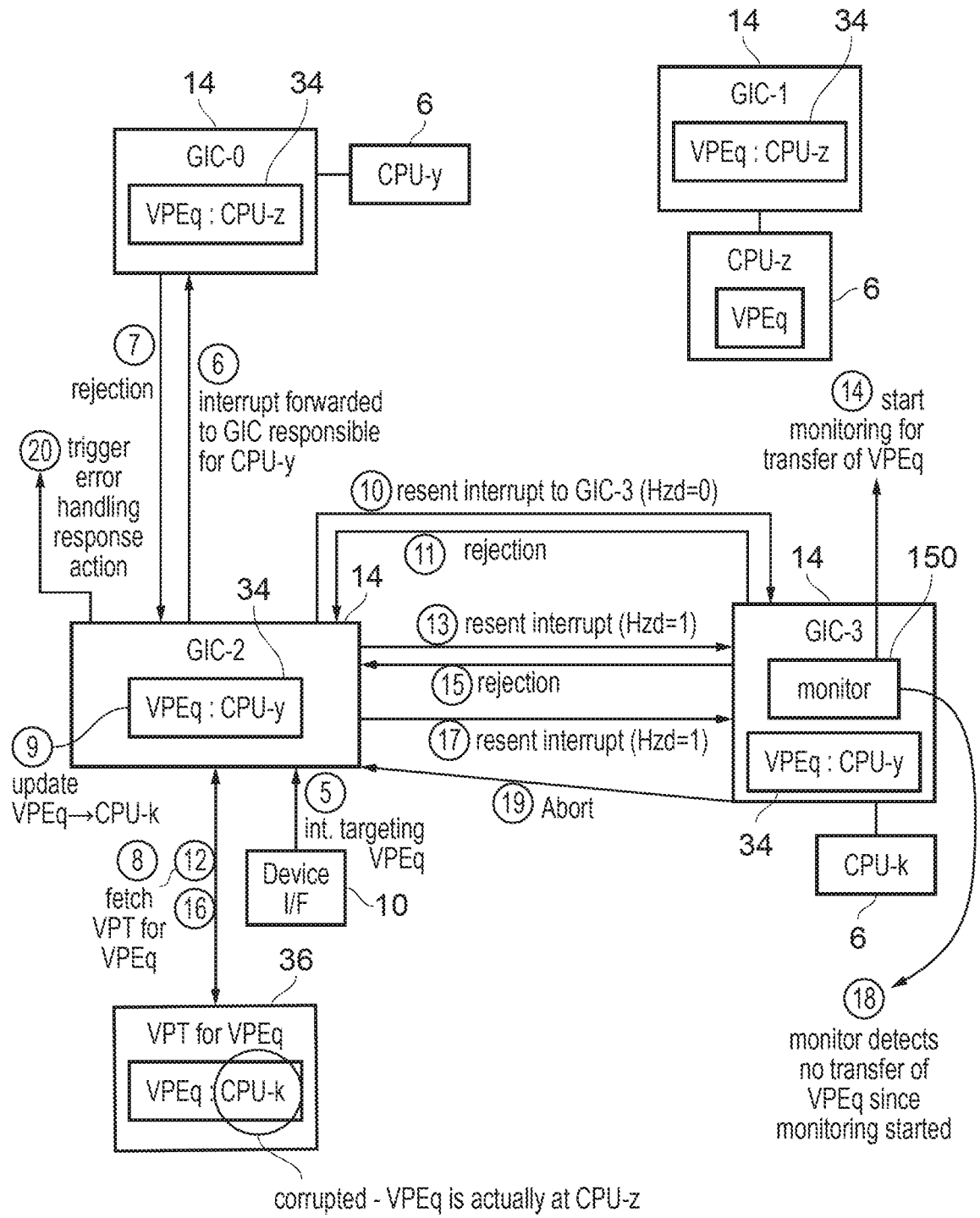
FIG. 10 schematically illustrates an example of use of monitoring circuitry to detect an error which leads to handling of an interrupt being aborted to prevent deadlock.

FIG. 10 shows an example when corruption of the VPT 36 stored in shared memory 12 leads to an error. For example this corruption could be due to a particle strike or other hardware fault leading to the VPT 36 for target virtual processor VPEq indicating that it is mapped to a physical processor CPU-k on chip 3, when VPEq is actually mapped to CPU-z on chip 1. This error could cause a deadlock if the error cannot be detected. FIG. 10 shows how the deadlock can be avoided using the monitoring mechanism to detect the error.

In example of FIG. 10 it is assumed that steps 1 to 4 have already been carried out as shown in FIG. 9, and so these are not shown again in FIG. 10. Subsequently an interrupt targeting VPEq is received from device interface 10 on chip 2 at step 5 of FIG. 10. The steps 5 to 9 are the same in FIG. 10 as in FIG. 9, except that now the VPT fetched from memory has indicated that VPEq is mapped to CPU-k instead of the actual location on CPU-z.

At step 10 of FIG. 10, the GIC-2 resends the interrupt, this time targeting GIC-3 as indicated by the updated virtual processor mapping information. The hazard flag is set to zero because this is the first attempt to send the interrupt to GIC-3 (this corresponds to the second pass through step 106 of FIG. 7, as the first pass was encountered at step 6 of FIG. 10). In response to the resent interrupt, the GIC-3 checks its virtual processor mapping information 34 cached in its local memory 30, which identifies that target virtual processor VPEq is mapped to CPU-y, which is not one of the subset of processors for which GIC-3 is responsible. Therefore at step 11 of FIG. 10, GIC-3 responds to GIC-2 with the rejection response (step 138 of FIG. 8). At step 12 of FIG. 10, GIC-2 once again re-fetches the VPT for VPEq in case it has changed (step 112 of FIG. 7), but this time GIC-2 detects that the location of VPEq indicated in the VPT 36 is the same as indicated in its cached virtual processor mapping information 34 (VPT still indicates CPU-k as mapped to VPEq). Therefore, this time at step 13 the GIC-2 resends the interrupt specifying the hazard flag equal to 1 (step 116 of FIG. 7). At step 14 of FIG. 10, the GIC-3 detects that the hazard flag is set to 1 and that it is not already monitoring for transfer of the target virtual processor VPEq and so starts its monitoring circuitry 150 monitoring for any transfer of the target virtual processor VPEq. At step 15 of FIG. 10, GIC-3 once again sends a rejection message to GIC-2 (step 144 of FIG. 8).

This rejection message triggers yet another attempt to re-fetch the VPT into GIC-2 (at step 16 of FIG. 10, corresponding to a second pass through step 112 of FIG. 7), and again a further resent interrupt request is sent at step 17 of FIG. 10, specifying the hazard flag equal to 1 (a second pass through step 116 of FIG. 7).

At step 18, the GIC-3 detects that the resent interrupt specified a hazard flag of 1 and that the monitoring circuitry 150 was already monitoring for transfer of the target virtual processor VPEq, and that VPEq is not indicated as having being transferred since the monitoring started. Therefore at step 19 of FIG. 10, an abort message is returned to GIC-2 (corresponding to step 146 of FIG. 8). In response, at step 20 of FIG. 10 the GIC-2 triggers the error handling response action (step 120 of FIG. 7).

Hence, it can be seen that through the monitoring of the transfer of VPEq and the provision of an abort response, this can avoid an infinite deadlock arising where GICs continually attempt to resend failed interrupt requests to the same destination and these are continually rejected by the recipient.

One may question why the monitoring by the monitoring circuitry 150 in GIC-3 only starts on the second resent interrupt request (at step 13) sent to that interrupt controller instead of on the first resent interrupt request at step 10. One might think it would be more efficient to only require a single instance of the resent interrupt request to be sent to GIC-3 before starting monitoring, so that the second attempt at steps 13 to 15 can be eliminated and the abort can be triggered in response to the second attempt to resend the interrupt to GIC-3.

However, as virtual processor transfers may be relatively common, it may be a reasonably frequent occurrence that an interrupt to a given target processor was asserted just before a VPE transfer is initiated, and so the interrupt still pending when the transfer has taken place, so that it is possible that between the sending of the first resent interrupt at step 10 of FIGS. 9 and 10 and the subsequent re-fetching of the VPT for the target virtual processor at step 12 of FIG. 10, the VPT has changed. In this scenario where a transfer has occurred after step 10, then if monitoring started in response to the interrupt sent at step 10 of FIG. 10, then this monitoring may continue indefinitely as having updated the VPT based on the transfer of the virtual processor, the subsequent attempt to resend the interrupt at step 13 may then be routed to a different interrupt controller to GIC-3 which started monitoring. Therefore GIC-3 may continue monitoring and the event for ending that monitoring may never come. This may waste monitoring resources in terms of the overhead in checking whether any transfer has occurred, and may prevent the monitoring resources being used for other virtual processors for which an error may have occurred. Also, this may result in aborts being triggered more frequently if there are two successive transfers of the same virtual machine in quick succession. Hence, the overhead of an additional handshake of the resent interrupt and the rejection may be less than the additional monitoring overhead and potential abort cost that could be incurred if monitoring was started at step 10 of FIG. 10 instead of at step 14. With the approach shown in FIGS. 7 to 10, this ensures that the monitoring starts on the second attempt to send the same interrupts to the same interrupt controller, and if there is a third attempt to resend the same interrupt to that same controller then processing of the interrupt can then be aborted.

While FIGS. 7 to 10 show a mechanism which uses a hazard flag to signal when interrupts are being resent to the same interrupt controller that has already been tried once before, other approaches could use a retry count which counts the specific number of resent interrupt requests made or could use another technique to provide a different encoding for the resent interrupt request compared to a previous attempt.

The retry mechanism described with respect to FIGS. 7 to 10 is described in terms of interrupts distributed between respective distributors 20 of the interrupt controllers 14, where each distributor 20 is responsible for routing interrupts to the physical processors 6 on a different integrated circuit. However the technique could also be used in cases where a single integrated circuit includes a number of different interrupt distributors.

For example, when considering just the GIC-14 on a single chip 4 as discussed above, the redistributors 42 which are each associated with an individual CPU could themselves be regarded as the "interrupt distributor" or "further interrupt distributors" described above, and in embodiments where there is a possibility that the "intra-chip" indication of which particular physical processor on the same chip as the GIC is mapped to a given virtual processor could be out of date, then the same technique could be used to re-route interrupts between the respective redistributors 42 on the same chip, so that if one processor rejects an interrupt because the virtual processor targeted by the interrupt is not mapped to that processor, then the interrupt can be resent to the redistributor 42 responsible for a different processor based on re-fetching of the shared mapping information defining the physical processor at which a given virtual processor is based at. Hence, in some examples a redistributor 42 could perform the methods shown in FIGS. 7 and 8 and can be regarded as the interrupt distributor and further interrupt distributors described above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
an interrupt distributor to receive an interrupt request to be handled by a target virtual processor selected from among a plurality of virtual processors mappable to a plurality of physical processors, where the interrupt distributor is responsible for distributing interrupt requests to a subset of said physical processors; and
an interface to communicate with further interrupt distributors responsible for distributing interrupt requests to physical processors other than said subset of said physical processors; in which:
in response to the interrupt request, the interrupt distributor is configured to:
determine, based on cached virtual processor mapping information, whether to route the interrupt request to one of said subset of physical processors or to one of the further interrupt distributors; and
when a rejection response is received in response to an interrupt request routed to one of the further interrupt distributors:
request an update of the cached virtual processor mapping information based on shared virtual processor mapping information obtained from a storage location accessible to the interrupt distributor and the further interrupt distributors; and
route a resent interrupt request to a further interrupt distributor determined based on the shared virtual processor mapping information.

2. The apparatus according to claim 1, comprising:
mapping update circuitry responsive to a virtual processor transfer command indicating that a given virtual processor is to be transferred from a source physical processor to a destination physical processor, to update the shared virtual processor mapping information to indicate that the given virtual processor is mapped to the destination physical processor.

3. The apparatus according to claim 2, in which the mapping update circuitry is associated with the interrupt distributor, and is configured to update the shared virtual processor mapping information when the destination physical processor is one of said subset of said physical processors for which the interrupt distributor is responsible.

4. The apparatus according to claim 3, in which the mapping update circuitry is configured to update the cached virtual processor mapping information, when the source physical processor or the destination physical processor is one of said subset of said physical processors for which the interrupt distributor is responsible.

5. The apparatus according to claim 2, in which the mapping update circuitry is configured to update the shared virtual processor mapping information without broadcasting the update of the shared virtual processor mapping information to one or more further interrupt distributors which are not responsible for distributing interrupt requests to either the source physical processor or the destination physical processor.

6. The apparatus according to claim 1, in which, in response to a received interrupt request received at the interrupt distributor from a given further interrupt distributor:
when the cached virtual processor mapping information indicates that a target virtual processor specified by the received interrupt request is mapped to one of said subset of physical processors for which the interrupt distributor is responsible, the interrupt distributor is configured to pass the received interrupt request to the physical processor to which the target virtual processor is mapped, and to return an acknowledgement response to the given further interrupt distributor; and
when the cached virtual processor mapping information indicates that the target virtual processor specified by the received interrupt request is not mapped to one of said subset of physical processors, the interrupt distributor is configured to provide said rejection response to the given further interrupt distributor.

7. The apparatus according to claim 1, in which when a resent interrupt request is sent to said one of said further interrupt distributors following at least one earlier attempt to send the interrupt request or the resent interrupt request to the same one of said further interrupt distributors:
the interrupt distributor is configured to issue the resent interrupt request with a different encoding to an encoding used for a first attempt to send the interrupt request or the resent interrupt request to said one of said further interrupt distributors.

8. The apparatus according to claim 1, comprising monitoring circuitry to perform monitoring for transfer of a specified virtual processor, to maintain tracking information indicating whether the specified virtual processor has been subject to a transfer of mapping to or from one of said subset of physical processors associated with the interrupt distributor.

9. The apparatus according to claim 8, in which in response to receipt of a resent interrupt request from a given further interrupt distributor, when at least one earlier attempt was already made to send the interrupt request or the resent interrupt request to the interrupt distributor, the cached virtual processor mapping information indicates that a target virtual processor specified by the resent interrupt request is not mapped to one of said subset of physical processors, and the monitoring circuitry is not already monitoring whether the target virtual processor has been subject to said transfer of mapping:

the interrupt distributor is configured to control the monitoring circuitry to start monitoring of whether the target virtual processor is subject to said transfer of mapping.

10. The apparatus according to claim 8, in which in response to receipt of a resent interrupt request from a given further interrupt distributor, when at least one earlier attempt was already made to send the interrupt request or the resent interrupt request to the interrupt distributor, the cached virtual processor mapping information indicates that a target virtual processor specified by the resent interrupt request is not mapped to one of said subset of physical processors, the monitoring circuitry has been monitoring for transfer of said target virtual processor, and the tracking information indicates that the monitoring circuitry has not detected said transfer of mapping for the target virtual processor:

the interrupt distributor is configured to provide an abort response to the given further interrupt distributor.

11. The apparatus according to claim 10, in which in response to receipt of said abort response from a further interrupt distributor in response to a resent interrupt request sent to that further interrupt distributor, the interrupt distributor is configured to trigger an error handling response action.

12. The apparatus according to claim 8, in which in response to receipt of a resent interrupt request from a given further interrupt distributor, when at least one earlier attempt was already made to send the interrupt request or the resent interrupt request to the interrupt distributor, the cached virtual processor mapping information indicates that a target virtual processor specified by the resent interrupt request is not mapped to one of said subset of physical processors, the monitoring circuitry has been monitoring for transfer of said target virtual processor, and the tracking information indicates that the monitoring circuitry has detected said transfer of mapping for the target virtual processor, the interrupt distributor is configured to provide the rejection response to the given further interrupt distributor.

13. The apparatus according to claim 1, in which said subset of physical processors comprises at least two physical processors.

14. The apparatus according to claim 1, in which said subset of physical processors comprises a single physical processor.

15. The apparatus according to claim 1, in which at least one of the further interrupt distributors is on a different integrated circuit to the interrupt distributor.

16. The apparatus according to claim 1, in which at least one of the further interrupt distributors is on a same integrated circuit as the interrupt distributor.

17. The apparatus according to claim 1, also comprising said further interrupt distributors.

18. An apparatus comprising:
means for distributing interrupt requests, to receive an interrupt request to be handled by a target virtual processor selected from among a plurality of virtual processors mappable to a plurality of physical processors, where the means for distributing is responsible for distributing interrupt requests to a subset of said physical processors; and
means for communicating with further means for distributing interrupt requests to physical processors other than said subset of said physical processors; in which:
in response to the interrupt request, the means for distributing is configured to:
determine, based on cached virtual processor mapping information, whether to route the interrupt request to one of said subset of physical processors or to one of the further means for distributing; and
when a rejection response is received in response to an interrupt request routed to one of the further means for distributing:
request an update of the cached virtual processor mapping information based on shared virtual processor mapping information obtained from a storage location accessible to the means for distributing and the further means for distributing; and
route a resent interrupt request to a further means for distributing determined based on the shared virtual processor mapping information.

19. A method comprising:
receiving, at an interrupt distributor, an interrupt request to be handled by a target virtual processor selected from among a plurality of virtual processors mappable to a plurality of physical processors, where the interrupt distributor is responsible for distributing interrupt requests to a subset of said physical processors, and further interrupt distributors are responsible for distributing interrupt requests to physical processors other than said subset of said physical processors; and
in response to the interrupt request, the interrupt distributor:
determining, based on cached virtual processor mapping information, whether to route the interrupt request to one of said subset of physical processors or to one of the further interrupt distributors; and
when a rejection response is received in response to an interrupt request routed to one of the further interrupt distributors:
requesting an update of the cached virtual processor mapping information based on shared virtual processor mapping information obtained from a storage location accessible to the interrupt distributor and the further interrupt distributors; and
routing a resent interrupt request to a further interrupt distributor determined based on the shared virtual processor mapping information.

* * * * *